(12) United States Patent
Linam et al.

(10) Patent No.: US 8,234,422 B2
(45) Date of Patent: Jul. 31, 2012

(54) INTERFACES, CIRCUITS, AND METHODS FOR COMMUNICATING WITH A DOUBLE DATA RATE MEMORY DEVICE

(75) Inventors: David Linam, Fort Collins, CO (US); Benjamin P. Haugestuen, Fort Collins, CO (US); Scott T. Evans, Fort Collins, CO (US)

(73) Assignee: Avago Technologies Enterprise IP (Singapore) Pte. Ltd, Singapore (SG)

( * ) Notice: Subject to any disclaimer, the term of this patent is extended or adjusted under 35 U.S.C. 154(b) by 153 days.

(21) Appl. No.: 12/557,658

(22) Filed: Sep. 11, 2009

(65) Prior Publication Data

US 2011/0063931 A1 Mar. 17, 2011

(51) Int. Cl.
- G06F 3/00 (2006.01)
- G06F 5/00 (2006.01)
- G11C 7/00 (2006.01)
- G11C 7/22 (2006.01)

(52) U.S. Cl. .................. 710/52; 365/189.011
(58) Field of Classification Search .................. None
See application file for complete search history.

(56) References Cited

U.S. PATENT DOCUMENTS

| | | | | |
|---|---|---|---|---|
| 6,615,345 B1* | 9/2003 | LaBerge | | 713/100 |
| 6,707,756 B2* | 3/2004 | Amidi | | 365/189.2 |
| 6,807,650 B2* | 10/2004 | Lamb et al. | | 716/101 |
| 7,164,292 B2 | 1/2007 | Schmitt et al. | | |
| 7,170,818 B2 | 1/2007 | Kyung | | |
| 7,292,500 B2* | 11/2007 | Liu et al. | | 365/233.1 |
| 7,558,132 B2* | 7/2009 | Carnevale et al. | | 365/193 |
| 7,587,547 B2* | 9/2009 | Teh et al. | | 711/105 |
| 7,590,879 B1* | 9/2009 | Kim et al. | | 713/401 |
| 7,739,538 B2* | 6/2010 | Fee et al. | | 713/600 |
| 2002/0017920 A1 | 2/2002 | Bridgewater | | |
| 2002/0188820 A1* | 12/2002 | Taruki | | 711/218 |
| 2006/0203602 A1 | 9/2006 | Best et al. | | |
| 2008/0036521 A1 | 2/2008 | Kogishi et al. | | |
| 2008/0094918 A1* | 4/2008 | Fujizoe | | 365/189.07 |
| 2008/0181047 A1* | 7/2008 | Haraguchi et al. | | 365/233.13 |
| 2008/0195719 A1* | 8/2008 | Wu et al. | | 709/213 |
| 2008/0242255 A1 | 10/2008 | Tamura | | |
| 2008/0304332 A1 | 12/2008 | Wang | | |
| 2009/0021998 A1* | 1/2009 | Millar et al. | | 365/193 |

(Continued)

OTHER PUBLICATIONS

Pavazanec, J et al., "On Design of Low-Noise Adaptive Output Drivers", IEEE Transactions on Circuits and SYstems-1: Fundamental Theory and Applications, vol. 46, No. 12 Dec. 1999 , 1487-1491.

*Primary Examiner* — Chun-Kuan Lee
*Assistant Examiner* — Ronald Modo

(57) ABSTRACT

An input/output interface reads data from and writes data to a DDR memory. The interface includes data and strobe circuits. The strobe circuit includes preamble logic, a first counter operating with a strobe clock, a second counter operating with an ASIC-generated clock, a strobe park circuit and a first synchronizer. The preamble logic receives strobe signals from the DDR memory and generates a preamble signal. The first counter generates a first input of the strobe park circuit. The second counter generates a second input of the strobe park circuit. The strobe park circuit controllably replaces the strobe signals from the DDR memory with respective non-transitioning signals when data is not being read. The data circuit includes a FIFO buffer and a second synchronizer. The FIFO buffer receives data with the strobe clock. The second synchronizer generates a representation of the data in response to the ASIC-generated clock.

21 Claims, 18 Drawing Sheets

U.S. PATENT DOCUMENTS

2009/0072856 A1* 3/2009 Subramaniam et al. ........ 326/38
2010/0135370 A1 6/2010 Best
2011/0019760 A1 1/2011 Nguyen
2011/0043220 A1 2/2011 Leibowitz et al.

* cited by examiner

INTERFACES, CIRCUITS, AND METHODS FOR COMMUNICATING WITH A DOUBLE DATA RATE MEMORY DEVICE

BACKGROUND

As computers and computer processors increase in performance, memory access performance becomes a significant factor affecting overall system performance. If an interface that communicates data between a memory device and a memory controller or other application device operates slower than a processor can use data, the interface can reduce the data processing capacity of the entire computer.

For dynamic random access memory (DRAM) devices, which are commonly used as the main working memory for a computer, various interconnect technologies have been developed over the years. One such interconnect technology is used for synchronous DRAMs, or SDRAMs, which utilize a source synchronous interface, where the source of data during a memory transfer is relied upon to provide a clock signal, often referred to as a data strobe signal (DQS), that is used by a target for the data to capture such data as it is being transferred over a data line to the target. In particular, the capture of data on a data line is typically latched by the rising or falling edge of the DQS signals, for example, so that the value transmitted on a data line when the data strobe signal transitions from low to high, or visa-versa, will be latched into a data latch in the target.

Double data rate (DDR) memory elements contain multiple buses. A command and address bus is formed by a number of signals, such as, for example, a column-address strobe (CAS), row-address strobe (RAS), write enable (WE), clock enable (CKE), chip-select (CS), address (ADDR), bank address (BA) signals, and differential clock signals (CK and CKn). The data bus contains the data signals (DQ), data mask (DM) and the source synchronous strobes (DQS and DQSN). DDR3 memory elements operate with differential strobes DQS and DQSN, which enable source-synchronous data capture at twice the clock frequency. Data is registered with the rising edge of DQS and DQSN signals.

DDR3 data is transferred in bursts for both read and write operations, sending or receiving 2, 4 or 8 data words with each memory access. For read operations, data bursts of various lengths are transmitted by the DRAM device edge aligned with a strobe. For write operations, data bursts of various lengths are received by the DRAM element with a 90 degree phase-delayed strobe. The strobe signal is a bidirectional signal used to capture data. After the data is captured in the source-synchronous strobe domain, the data must be transferred into a local clock domain.

For dual in-line memory modules or DIMMs, the DDR3 memory specification includes what is commonly known as a "flyby" topology for clock, address and control connections that are shared between all of the DRAM devices on the DIMM. As opposed to the balanced tree arrangement used in DDR2 memory, which provides clock, address and control signals of approximately the same length to each memory element in a memory module at the expense of signal integrity, the flyby topology is arranged to promote signal integrity and requires clock, address and control connections of different lengths for each device within the module. Since the DDR3 SDRAM devices require a specific timing relationship between the data, strobe and clock, the DDR3 specification supports an independent timing calibration for each source synchronous group. During a write-leveling calibration, a free running clock is propagated from the ASIC or host to the data input of a dedicated internal calibration register in a target DRAM. A strobe clock signal pulse is propagated to the clock input of the dedicated internal calibration register. During the calibration process (commonly known as "write leveling"), the output of the dedicated internal calibration register indicates the phase alignment between the free-running clock and the source-synchronous strobe at the DRAM. This output is propagated back to the host on one or more of the data signal lines to the memory controller. The calibration is repeated with different delay values until an optimum write-leveling delay is determined. The host uses the optimized write-leveling delay information to control data transfers delays to the target.

Write operations to a DDR3 memory present some challenges for an interface designer attempting to create an interface with low-latency while maintaining signal integrity. Since the relative timing relationship between the ASIC or core clock and the DDR3 memory device is determined during the write-leveling calibration procedure, the interface designer should be prepared for a write-leveling delay range that can vary from no delay whatsoever to a full clock period. Output data from the memory controller is typically transferred synchronously in the core clock domain, but must be transferred to the delayed or leveled domain for synchronous output to the DRAM device. A first-in, first-out (FIFO) circuit exists to reliably handle the domain transfer, but such a circuit may not be optimal from the standpoint of complexity, area, and latency.

During a read operation, a host or receiving device issues a read command and communicates a clock signal to the source DRAM. After a DRAM internal delay, the DRAM returns a data signal and strobe clock signal to the host. The host uses the strobe clock signal to capture the data signal. The data signal is captured in the source-synchronous strobe domain and must be transferred into the local clock domain. The DRAM transmits a preamble on the strobe signals at the beginning of each read data burst. The preamble places the positive-true and negative-true strobe signals in a differential state to ensure that the differential strobe receiver outputs are in a valid state in preparation for the first strobe edge. The host may use the preamble period as a window in which to gate, or "unpark" the strobe receiver outputs.

However, before a preamble arrives at the strobe pins, the differential inputs on the strobe receivers are driven to a termination voltage or $V_{TT}$, which is ½ of $V_{DD}$ for DDR3 signals. When both inputs of a differential receiver are driven to the same voltage level, the output of the differential receiver depends on the input offset voltage, which typically is determined by random device mismatch and is thus undefined, or could randomly toggle because of noise on the bus. Because the outputs of the differential strobe receivers are used to clock registers, counters and other logic elements, the differential strobe receiver outputs must be gated until the data stream is received at the strobe pad inputs. Thus, the input strobe signals must be reliably gated or switched to ensure proper operation of logic elements on the strobe pad and the data pads.

If the strobe preamble is used a window in which to unpark the differential strobe receiver outputs, a programmable delay, operating in the core clock domain, may be used to align the parking control signal with the strobe preamble. A read gate training operation can be applied by sending a read command with a particular park control delay and sampling the incoming strobe signal(s) with a register clocked by the parking control signal. If the strobe signal is sampled during the preamble, the sampling register will store a logic "0". If the strobe signal is sampled after the first strobe edge, the sampling register will contain a logic "1". The procedure is repeated with various delays, and the optimum delay is computed to place the parking control in the center of the preamble. The strobe preamble is ideally a full clock cycle long, but the gating window may be substantially shorter due to signal propagation times through the differential receivers, logic gates, and strobe distribution paths. As long as the relative timing between the DRAM and the host element remain within the width of the preamble window, data read operations can be performed reliably. U.S. Pat. No. 7,170,818 illustrates and describes a circuit that samples and forwards incoming strobe signals in accordance with one of eight phase-separated clock signals to reliably gate the incoming strobes. The eight phase-separated clock signals are separated in equal intervals of 45 degrees to cover a full clock cycle. Once the training operation is complete and the programmable timing is set, significant drift in the timing relationship can cause a synchronization failure between a host and a DRAM. Timing variation or drift due to temperature and voltage changes that are tolerable at lower data rates may become catastrophic at increased data rates. The above-described prior art does not provide a solution that can address timing variation and drift between clock domains over time. Under these varying conditions, i.e., when uncertainty or variation in the round trip timing delay approaches one-half of a clock period, the circuit described in the prior art would not be an adequate solution for reliably communicating with a DDR memory element.

SUMMARY

Interfaces, circuits, and methods for communicating with a DDR memory are presented. The interfaces, circuits, and methods detect the arrival of a preamble signal event rather than assume that the preamble signal event will occur at a designated time in relation to a programmable delay. The interfaces, circuits, and methods enable reliable domain transfers of write data and a driver enable signal from an unleveled (i.e., uncorrected) domain to a leveled (i.e., corrected) domain without regard to a write leveling delay value. The interfaces, circuits, and methods not only accomplish the domain transfers reliably, they perform the domain transfers with low-latency.

An embodiment of an input/output interface for communicating between an application specific integrated circuit (ASIC) with a memory controller and a double data rate (DDR) memory device includes a strobe circuit and a data circuit. The strobe circuit includes preamble logic, a first counter, a second counter, a strobe park circuit, and a first synchronizer. The preamble logic receives strobe signals from the DDR memory device and generates a preamble signal. The first counter receives the preamble signal and the strobe signals and generates a strobe count signal. The second counter receives a read enable signal and an ASIC-generated clock and generates a read count signal. The strobe park circuit receives the preamble signal, the read count signal and the strobe count signal. The strobe park circuit generates a control signal that controllably replaces the strobe signals from the DDR memory with respective non-transitioning signals. The first synchronizer receives the ASIC-generated clock and generates a synchronized count in response to a reset signal from the memory controller. The data circuit includes a first-in first-out (FIFO) buffer and a second synchronizer. The FIFO buffer receives data from the DDR memory device, the strobe signals, and the strobe count signal and generates a read data signal. The second synchronizer receives the read data signal, the ASIC-generated clock and the synchronized count. The second synchronizer generates a representation of the read data signal in synchronization with the ASIC-generated clock.

An embodiment of a method for communicating between an application specific integrated circuit (ASIC) and a double data rate (DDR) memory device includes the steps of (in a read mode) detecting a strobe preamble, using a state machine to activate strobe receiver output signals in response to the strobe preamble, receiving an indication via signal transitions in an ASIC-generated clock and a read data enable signal of a data string length to be read from the DDR memory device, generating a first count of ASIC-generated clock signal transitions while receiving data from the DDR memory device, generating a second count of incoming strobe signal transitions while receiving data from the DDR memory device, determining when the read data enable signal transitions, generating a control signal when the first count and the second count are equal and using the state machine to deactivate the strobe receiver output signals in response to the combination of the read data control signal transition and the control signal. The method further including the steps of (in a write mode) generating a source clock signal responsive to the ASIC-generated clock, generating a synchronizing signal as a function of the source clock signal and a select one of three stages from a domain crossing circuit, generating a write-leveled representation of the source clock signal and the synchronizing signal, generating a third count responsive to transitions of the source clock signal and the synchronizing signal, generating a fourth count responsive to transitions of the write-leveled representation of the source clock signal and the write-leveled representation of the synchronizing signal, controllably latching data to be written to the DDR memory device to a first latch and a second latch in accordance with the third count and controllably switching between an output of the first latch and an output of the second latch in accordance with the fourth count to generate a data output signal.

The figures and detailed description that follow are not exhaustive. The disclosed embodiments are illustrated and described to enable one of ordinary skill to make and use the circuits and methods for communicating with a DDR memory device. Other embodiments, features and advantages of the circuits and methods will be or will become apparent to those skilled in the art upon examination of the following figures and detailed description. All such additional embodiments, features and advantages are within the scope of the circuits and methods as defined in the accompanying claims.

BRIEF DESCRIPTION OF THE FIGURES

The interfaces, circuits, and methods for communicating with a DDR memory device can be better understood with reference to the following figures. The components within the figures are not necessarily to scale, emphasis instead being placed upon clearly illustrating the principles of reading data from and writing data to the DDR memory device. Moreover, in the figures, like reference numerals designate corresponding parts throughout the different views.

DETAILED DESCRIPTION

Figure 1:
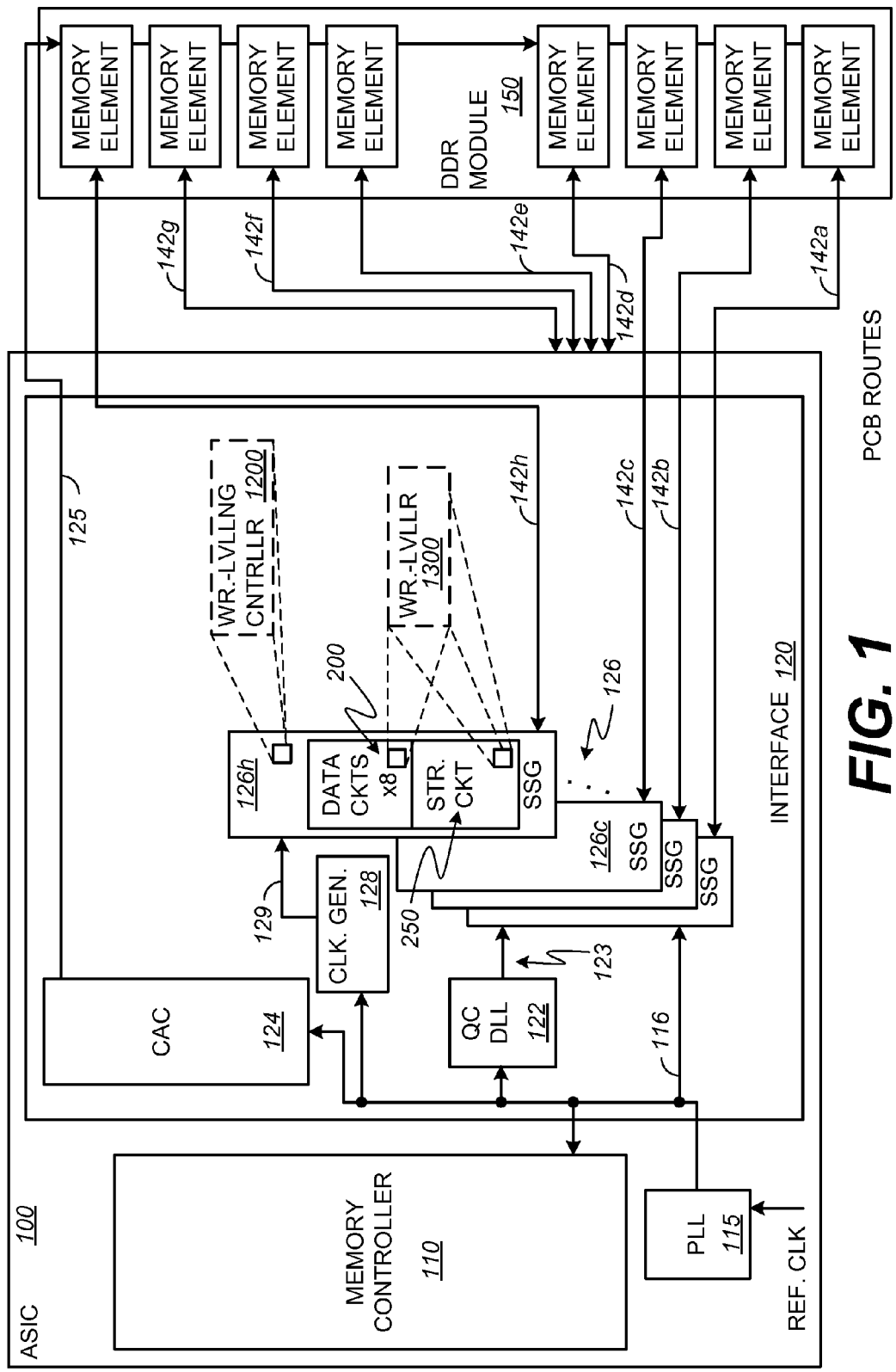
FIG. 1 is a functional block diagram of an embodiment of an ASIC with an interface for communicating with a DDR memory module.

An input/output interface communicates with a DDR memory device. More specifically, the interface reads data from and writes data to the DDR memory device. In an example embodiment, the interface is implemented on an application specific integrated circuit (ASIC).

The interface includes a clock generation and distribution device, which receives a reference clock and generates multiple clock signals that are forwarded to a write-leveling controller in each source synchronous group. Each source synchronous group further includes data and strobe circuits. The data and strobe circuits each include an instance of a write leveler. The write leveler is a domain crossing circuit that aligns one or more signals between an ASIC or core clock domain and a leveled or delayed clock domain. When implemented on a data circuit, the write leveler receives data and driver enable signals from a memory controller operating in an ASIC clock domain and generates an adjusted data signal and a driver enable signal in accordance with clock and synchronizing signals from a write-leveling controller associated with the source-synchronous group. When implemented on a strobe circuit, the write leveler uses the received clock and synchronizing signals to generate an adjusted clock signal. One-bit counters in the write-leveling controller operate in both the ASIC-clock domain and the leveled clock domain to generate synchronized counter outputs that are applied to the write levelers to generate an optimized write-leveled data output. In combination, the write-leveling controller, as implemented in the source-synchronous data group, and the write leveler, as implemented on the data and strobe circuits, enable reliable domain transfers of write data and driver enable signals from the unleveled to the leveled domains regardless of the write-leveling delay value.

The strobe circuit also includes a preamble detector, a first counter operating with a strobe clock, a second counter operating with an ASIC-generated clock, a strobe park circuit and a first synchronizer. The preamble detector receives differential strobe signals from the DDR memory device and generates a preamble signal. The preamble signal initializes the first counter and the strobe park circuit. The first counter operates in accordance with strobe select signals and generates a first count that is applied at a first input of the strobe park circuit. A read data enable signal initializes the second counter. The second counter operates in accordance with ASIC-generated clocks and generates a second count that is applied to a second input of the strobe park circuit. The strobe park circuit operates in accordance with a strobe clock received from the DDR memory device, the first count and the second count. The strobe park circuit controllably replaces the outputs of the differential receivers that receive the differential strobe signals from the DDR memory device with respective non-transitioning signals when data is not being read. When data is being read, the strobe park circuit uses a state machine to determine when to deactivate or park the received strobe signals.

The data circuit also includes a FIFO buffer and a second synchronizer. The FIFO buffer receives data with the strobe clock. The second synchronizer generates a representation of the data in response to the ASIC-generated clock.

Turning now to the drawings, wherein like reference numerals designate corresponding parts throughout the drawings, reference is made to FIG. 1 which illustrates an embodiment of an ASIC 100 with an interface 120 for communicating with a DDR memory module 150. In the example embodiment, the ASIC 100 includes a memory controller 110. However, in alternative arrangements the memory controller 110 may be implemented on a shared printed circuit board or located remotely from and coupled to the ASIC 100 via one or more connectors (not shown).

The memory controller 110 is any device that includes logic for accessing and managing data stored in the various memory elements of the DDR module 150. In the illustrated embodiment, a reference clock is provided at an input to a phase-locked loop element (PLL) 115. The PLL element 115 generates a modified reference that has a fixed relation to the phase of the reference clock. The PLL element 115 responds to both the frequency and the phase of the reference clock. The modified reference is coupled on clock and data bus 116 to the memory controller 110, a quarter-cycle delay-locked loop element (QC DLL) 122, a command, address, and clock controller (CAC) 124, each of the source synchronous groups (SSGs) 126 and a clock generation and distribution element 128. In this way, the PLL element 115 provides an ASIC-generated clock signal to each of the memory controller 110, the QC DLL 122, the CAC 124, the SSGs 126 and the clock generation and distribution element 128.

The CAC 124 operates under the direction of the memory controller 110 and in accordance with one or more ASIC-generated clock signals to issue the necessary commands, addresses, and clock signals via command, address and clock bus 125 to access identified rows and columns in each of the memory elements within the DDR module 150.

The QC DLL 122 generates a compensation code that is propagated to delay elements in the strobe circuit that enable the strobe output and input signals to be delayed by a quarter clock cycle from the ASIC-generated clock and the source synchronous strobe, respectively. The compensation code that is propagated to the delay elements varies with one or more of process, voltage and temperature. The compensation code is provided to each of the SSGs 126 via bus 123. Each of the SSGs 126 in the interface 120 are separately coupled to a corresponding memory element in the DDR module 150 via a source synchronous data and clock bus 142. In the illustrated embodiment, the DDR module 150 includes eight commonly addressable memory elements with SSG 126a coupled to a first memory element via bus 142a, SSG 126b coupled to a second memory element via bus 142*b*, and so on through SSG 126*h*, which is coupled to the eighth memory element via bus 142*h*. As shown in FIG. 1, each of bus 142*a*, bus 142*b*, through to bus 142*h* traverses a printed circuit board via a distinct route which may have a unique length different from the respective lengths of the remaining source synchronous data and clock busses. Thus, each SSG 126 is arranged with a set of eight data circuits (D PADS) 200 and a strobe circuit 250 to enable source synchronous data transfers to and from the DDR module 150. Source synchronous data transfers include both write operations to and read operations from an identified row and column within an identified memory element of the DDR module 150.

The clock generation and distribution element 128 generates a number of clock signals that are propagated along clock bus 129 to a write-leveling controller 1200 and a write leveler 1300. For example, the clock generation and distribution element 128 generates a write clock signal (WR_CLK) and a double frequency write clock signal (WR_CLK_2X). The write-leveling controller 1200 in each of the source synchronous groups 126 receives the clocks generated by the clock generation block 128 and propagated through connection 129 and generates a synchronizing signal (WR_CLK_SYNC), a write leveled representation of the synchronizing signal (WR_CLK_SYNC_LEV), and a write leveled version of the double frequency write clock signal (WR_CLK_2X_LEV) (all not shown in FIG. 1). The double frequency write clock signal (WR_CLK_2X), the synchronizing signal (WR_CLK_SYNC) and the write-leveled versions of these signals are used by the write-leveling controller 1200 in each of the source synchronous groups 126 and propagated to the data circuits 200 and strobe circuit 250 within the source synchronous group. The write-leveling controller 1200 also receives a control signal from the memory controller. The write-leveling controller 1200 is shared between all of the data circuits 200 and strobe circuits 250 within a source synchronous group 126. The control signal from the memory controller includes delay information from a write-leveling calibration procedure. The write-leveling controller 1200 uses the control signal to controllably delay the double frequency clock (WR_CLK_2X) to produce a write-leveled clock (WR_CLK_2X_LEV) and adjust a domain crossing circuit to generate a suitably delayed or write-leveled count signal responsive to the write-leveled representations of the double frequency write clock signal and the synchronizing signal. The synchronized counter output signals (WR_CNT and WR_CNT_LEV) are propagated to the write leveler 1300 within each instance of a data circuit 200 and each instance of a strobe circuit 250 within each of the source synchronous groups. Details and operation of an embodiment of the write-leveling controller 1200 will be described below in association with the circuit illustrated in FIG. 12.

In addition to the synchronized counter output signals, the write leveler 1300 receives the double frequency write clock signal, the synchronizing signal, the write leveled version of the double frequency write clock signal, and the write leveled version of the synchronizing signal. In turn, the write leveler 1300 uses the various clock and count signals to generate a write-leveled data output signal (WR_DATA_OUT) and a write-leveled driver-enable signal that are applied within each of the data circuits 200 and the strobe circuit 250 within the source synchronous group. Details and operation of the write leveler 1300 will be described below in association with the circuit illustrated in FIG. 13.

Figure 2:
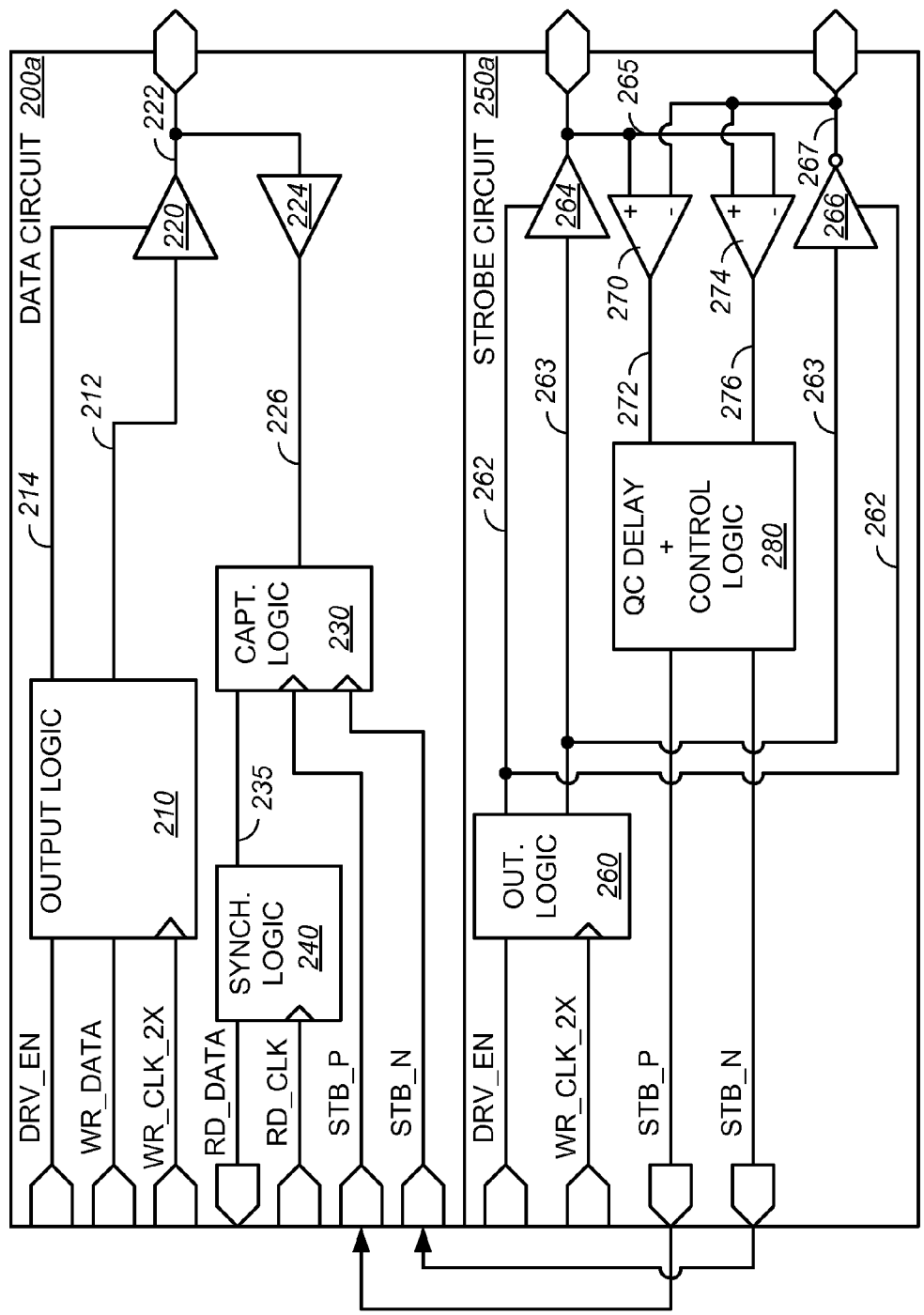
FIG. 2 is functional block diagram illustrating an embodiment of the strobe and data circuits of the interface of FIG. 1.

FIG. 2 is a functional block diagram illustrating an embodiment of the data circuit 200*a* and the strobe circuit 250*a* of the SSGs 126 within the interface 120 of FIG. 1. In the illustrated embodiment, the data circuit 200*a* includes output logic 210, a driver 220, a receiver 224, capture logic 230 and synchronization logic 240. In a write mode of operation directed by the memory controller 110 (FIG. 1), the output logic 210 receives a drive enable signal (DRV_EN) and a write data signal (WR_DATA) from the memory controller 110 and a double frequency write clock signal (WR_CLK_2X) from the clock generation circuit 128 and generates a data output that is communicated to the driver 220 on connection 212 and a control output that is communicated to the driver 220 on connection 214. The driver 220 buffers the data output received on connection 212 and transmits a buffered data output on connection 222, which is coupled to a data pin of an identified memory element within the DDR module 150 (FIG. 1).

The strobe circuit 250*a* includes circuit elements for generating and receiving source synchronous strobe signals. In the embodiment illustrated in FIG. 2, the strobe circuit 250*a* includes output logic 260, a true driver 264, a complimentary driver 266, a true receiver 270, a complimentary receiver 274 and a quarter-cycle delay element (QC delay) and control logic element 280. In an output or write mode of operation, the output logic 260 receives a drive enable (DRV_EN) signal and a write clock signal (WR_CLK). In response to these and other signals from the memory controller 110 (not shown), the output logic 260 generates a drive control signal which is communicated to a control input of both the true driver 264 and a control input of the complimentary driver 266 on connection 262. In addition, the output logic 260 generates a strobe signal that is communicated to a data input of both the true driver 264 and a data input of the complimentary driver 266 on connection 263.

In an input or read mode of operation, a true strobe signal is received at a true or positive data input of the true receiver 270 and at a complimentary or negative data input of the complimentary receiver 274 on connection 265. Similarly, a complimentary strobe signal is received at a true or positive data input of the complimentary receiver 274 and at a complimentary or negative data input of the true receiver 270 on connection 267. In turn, the true receiver 270 generates a buffered representation of the true strobe signal, which is communicated to the QC delay and control logic element 280 on connection 272. Similarly, the complementary receiver 274 generates a buffered representation of the complimentary strobe signal, which is communicated to the QC delay and control logic element 280 on connection 276. In response to the buffered strobe signals, the QC delay and control logic element 280 generates a true strobe signal (STB_P) and a complimentary strobe signal (STB_N). The strobe signals are coupled to appropriate inputs of the capture logic 230 located in the data circuit 200*a*. The data circuit 200*a* receives a data signal on connection 222, which is coupled to a data input of the receiver 224. The receiver 224 buffers the data signal and communicates a buffered version of the data signal on connection 226 to the capture logic 230. In turn, the capture logic 230 acquires the data signal in accordance with the true strobe signal and the complimentary strobe signal and communicates the captured data signal (in the strobe domain) to the synchronization logic 240 on connection 235. The synchronization logic 240 receives an ASIC-generated clock signal (or RD_CLK signal) and translates the received data from the strobe-clock domain to the ASIC-clock domain. The received and translated data is communicated via the signal labeled RD_DATA exiting the synchronization logic 240.

Figure 3A:
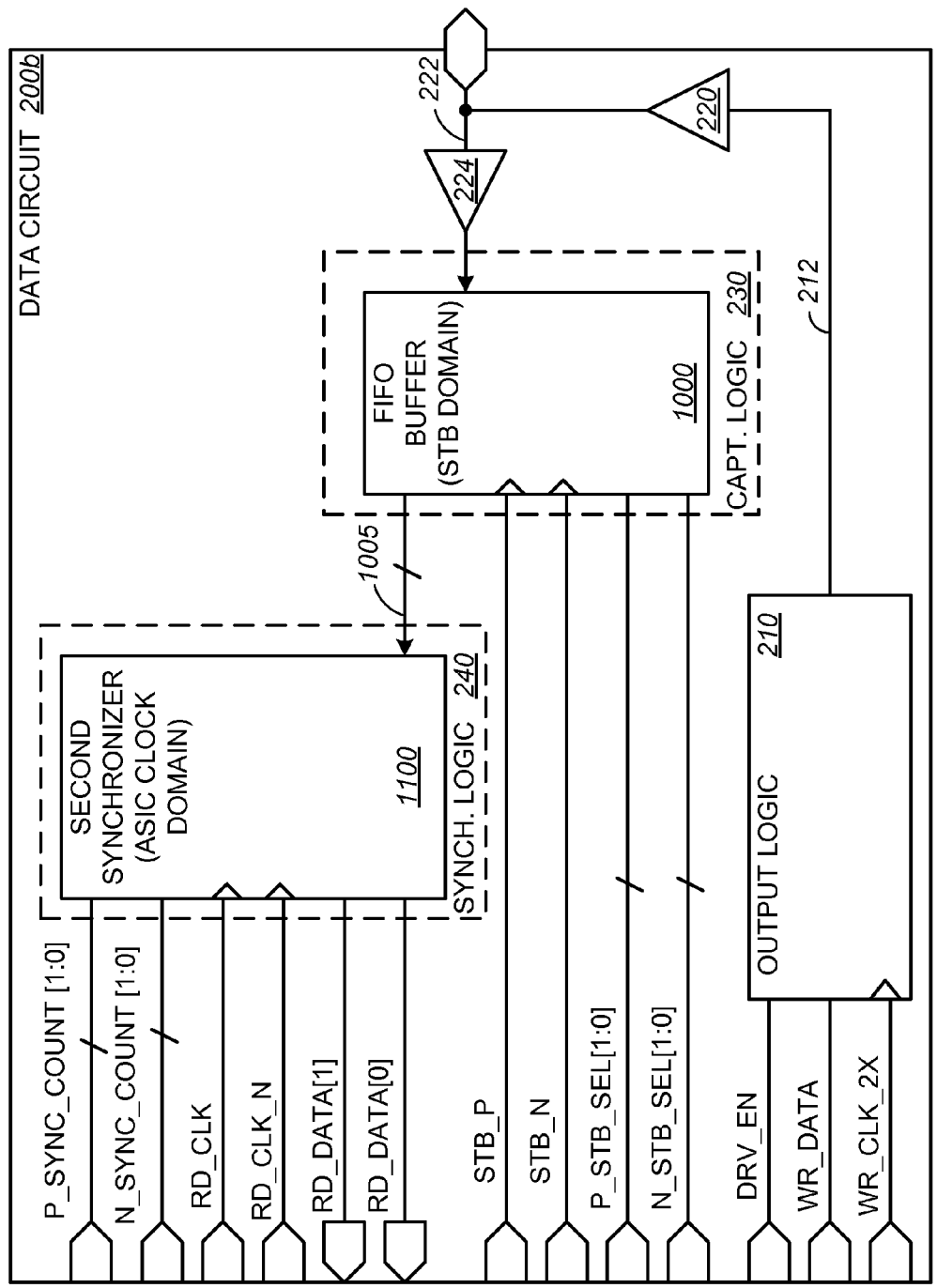
FIG. 3A is a functional block diagram illustrating an embodiment of the data circuit of FIG. 2.

FIG. 3A is a functional block diagram illustrating an embodiment of the data circuit of FIG. 2. In the illustrated embodiment, the data circuit 200*b* includes the output logic 210, the driver 220, the receiver 224, a FIFO buffer 1000 and a second synchronizer 1100. In the illustrated embodiment, the FIFO buffer 1000, which operates in the strobe clock domain, performs the functions associated with the capture logic 230 of FIG. 2 and the second synchronizer 1100, which operates in the ASIC or core clock domain, performs the functions associated with the synchronization logic 240 of FIG. 2.

In a write mode of operation directed by the memory controller 110 (FIG. 1), the output logic 210 receives the drive enable signal (DRV_EN), the write data signal (WR_DATA) from the memory controller 110 and the write clock signal (WR_CLK_2X) from the clock generation circuit 128 and generates a data output that is communicated to the driver 220 on connection 212. The driver 220 buffers the data received on connection 212 and communicates a buffered data output on connection 222, which is communicated to a data pin of an identified memory element within the DDR module 150 (FIG. 1).

In a read mode of operation directed by the memory controller 110 (FIG. 1), the receiver 224 receives a data signal on connection 222 from a previously addressed DDR memory element. The received data signal is buffered and forwarded to the FIFO buffer 1000 for further processing in the strobe clock domain. As further illustrated in FIG. 3A, the FIFO buffer 1000 also receives a true strobe clock signal (STB_P), a complimentary strobe clock signal (STB_N), as well as strobe select signals (P_STB_SEL[1:0] and N_STB_SEL[1:0]). The FIFO buffer 1000 is arranged to hold the received data and maintain data validity for up to four clock cycles in the strobe clock domain. The FIFO buffer 1000 responds to the received data, strobe and differential strobe select signals by controllably applying the received data on appropriate data signal connections within the data bus 1005, which are coupled to corresponding data inputs of the second synchronizer 1100. Details and operation of an embodiment of the FIFO buffer 1000 will be described below in association with the circuit illustrated in FIG. 10.

As shown in FIG. 3A, in addition to receiving the multiple data inputs, the second synchronizer 1100 also receives true and complimentary ASIC-generated clock signals (RD_CLK and RD_CLK_N), as well as synchronizing count signals (P_SYNC_COUNT[1:0] and N_SYNC_COUNT[1:0]). The second synchronizer 1100 is arranged to generate and communicate first and second data signals (RD_DATA0 and RD_DATA1) in synchronization with the ASIC-generated clock. Details and operation of an embodiment of the second synchronizer 1100 will be described below in association with the circuit illustrated in FIG. 11.

Figure 3B:
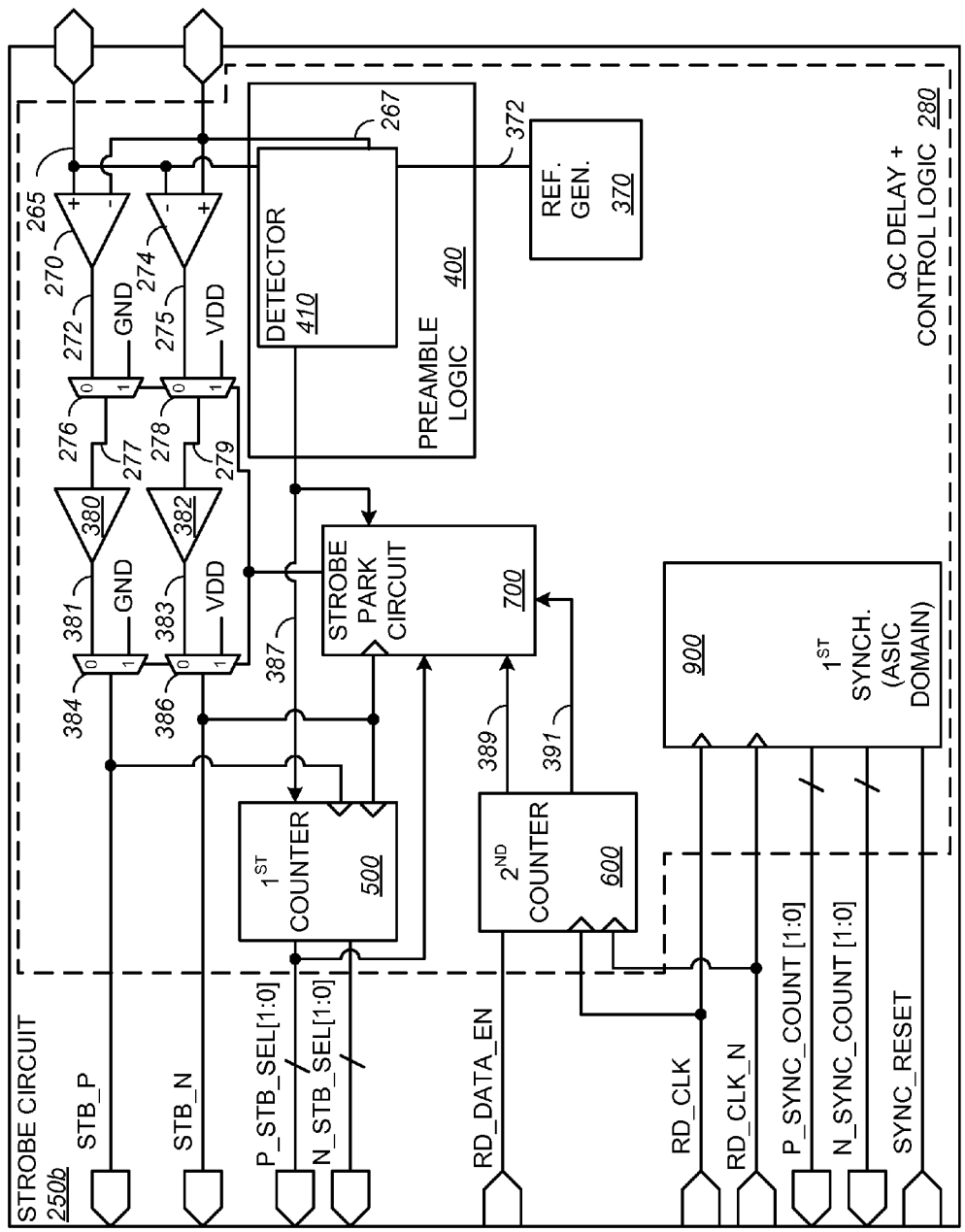
FIG. 3B is a functional block diagram illustrating an embodiment of the strobe circuit of FIG. 2.

FIG. 3B is a functional block diagram illustrating an embodiment of the strobe circuit 250a of FIG. 2. The strobe circuit 250b includes circuits and elements for receiving, buffering and controllably parking the buffered outputs of received true and complimentary strobe signals. In addition, the strobe circuit 250b includes circuits and elements for detecting a strobe preamble and for generating synchronizing counter signals for use in the data circuit 200b. The strobe circuit 250b receives a true strobe signal on connection 265 and a complimentary strobe signal on connection 267. The true and complimentary strobe signals are generated by a previously addressed DDR memory module 150 and communicated on a source synchronous data and clock bus 142 (FIG. 1). The strobe circuit 250b also receives a synchronization reset signal (SYNC_RESET) and a read data enable signal (RD_DATA_EN) from the memory controller 110 (FIG. 1) as well as a true read or ASIC-generated clock signal (RD_CLK) and a complimentary read or ASIC-generated clock signal (RD_CLK_N). The read data enable signal identifies the contiguous read data string length by the number of clock cycles the read data enable signal is asserted. The synchronization reset signal resets the $1^{st}$ synchronizer for correct data synchronization between the different clock domains. In response to the received strobe signals, ASIC-generated clock signals and control signals, the strobe circuit 250b controllably forwards a representation of the true and complimentary strobe signals as well as data select and synchronization count signals that are used on the data circuit 200b to perform a source synchronous data capture and synchronization of an incoming data signal.

In the illustrated embodiment, the strobe circuit 250b includes a reference generator 370, preamble logic 400, a $1^{st}$ counter 500, a $2^{nd}$ counter 600, a strobe park circuit 700 and a $1^{st}$ synchronizer 900. In addition to these circuits or elements, the strobe circuit 250b includes a true strobe receiver 270, a complimentary strobe receiver 274, a true strobe quarter-cycle delay element 380, a complimentary strobe quarter-cycle delay element 382, a first multiplexer 276, a second multiplexer 278, a third multiplexer 384 and a fourth multiplexer 386. In the illustrated embodiment, the reference generator 370, preamble logic 400, $1^{st}$ counter 500, $2^{nd}$ counter 600, strobe park circuit 700, and the $1^{st}$ synchronizer 900 perform some of the functions associated with the QC delay and control logic 280 of FIG. 2.

The strobe circuit 250b receives a true strobe input on connection 265, which is coupled to the non-inverting input of the true strobe receiver 270, a first input of the detector 410 and the inverting input of the complimentary strobe receiver 274. The strobe circuit 250b also receives a complimentary strobe input on connection 267, which is coupled to the non-inverting input of the complimentary strobe receiver 274, a second input of the detector 410 and the inverting input of the true strobe receiver 270. The output of the true strobe receiver 270 is coupled on connection 272 to a first input of the first multiplexer 276. A second input of the first multiplexer 276 is connected to a logical "0" (e.g., electrical ground). The output of the complimentary strobe receiver 274 is coupled on connection 275 to a first input of the second multiplexer 278. A second input of the second multiplexer 278 is connected to a logical "1" (e.g., the supply voltage VDD). The control inputs of the first multiplexer 276 and the second multiplexer 278 are coupled to an output of the strobe park circuit 700. In accordance with the output of the strobe park circuit 700 one of the output of the true strobe receiver 270 and a logical "0" is propagated to the input of the true strobe quarter-cycle delay element 380, which provides a buffered and quarter-cycle delayed version of the received true strobe signal at a first data input of the third multiplexer 384 via the connection 381. A second data input of the third multiplexer 384 is coupled to logical "0" (e.g., GND). Similarly, and in accordance with the output of the strobe park circuit 700 one of the output of the complimentary strobe receiver 274 and a logical "1" is coupled to the input of the complimentary strobe quarter-cycle delay element 382, which provides a buffered and quarter-cycle delayed version of the received complimentary strobe signal at a first data input of the fourth multiplexer 386 via connection 383. A second data input of the second multiplexer 386 is coupled to a logical "1" (e.g., VDD). In accordance with the control signal generated by the strobe park circuit 700, the third multiplexer 384 and the fourth multiplexer 386 controllably replace the true and complimentary strobe signals from the DDR memory with respective non-transitioning signals. As indicated in FIG. 3B, the third multiplexer 384 controllably replaces the true strobe signal with logic "0" and the fourth multiplexer 386 controllably replaces the complimentary strobe signal with the logic "1".

In accordance with a source synchronous data transmission standard, the DDR memory module 150 (FIG. 1) generates differential strobe signals (DQS and DQSN). When the DDR memory module is inactive, the strobe circuit drivers on the module are tristated and the steady-state strobe signal voltages on connection 265 and on connection 267 are terminated or held at a termination voltage (VTT), which is approximately mid-range between a supply voltage (VDD) and electrical ground. When the DDR memory module is active, the strobe circuit drivers on the module generate differential time-varying strobe signals that transition between VLow and VHigh. VLow is a voltage between electrical ground and the termination voltage level. VHigh is a voltage between the supple voltage VDD and the termination voltage level. Consequently, the differential strobe signals transition from VHigh to VLow and vice versa.

In a read mode, the true strobe signal on connection 265 transitions from the termination voltage level to VLow, where it remains for nearly a full clock cycle, while the complimentary strobe signal on connection 267 transitions from the termination voltage level to VHigh, where it remains for about a full clock cycle. To be more specific, the respective strobe signal drivers are tristated, the strobe signal connection 265 and the strobe signal connection 267 are undriven, and the respective voltages on the strobe signal connections are pulled to the termination voltage. The initial period during which the true strobe signal 265 and the complementary strobe signal 267 are driven to logic "0" and logic "1", respectively, for nearly a full clock cycle is know as the strobe preamble. Thereafter, the strobe signals transition every half-clock cycle. To perform a source synchronous data transfer, a first data register, coupled to the data circuit, receives data in accordance with rising signal transitions of the true strobe signal and a second data register, coupled to the data circuit, receives data in accordance with rising signal transitions of the complimentary strobe signal.

To provide setup and hold margin, the first and second data registers are clocked with a quarter-cycle delayed version of the strobe signals. When the ASIC 100 is not in a read mode of operation the received and buffered strobe signals on strobe circuit 250b, i.e., STB_P and STB_N, will be "parked" or replaced by logic "0" and logic "1," respectively. When both inputs of a differential receiver are clamped to a common voltage level (e.g., VTT), the output of the differential receiver is undefined and spurious voltage changes on one or both of the inputs of the differential receiver may initiate an unintended downstream signal transition, which can lead to data corruption in FIFO buffers. Because the outputs of the differential strobe receivers are used to clock registers, counters and other logic elements, the differential strobe receiver outputs are "parked" or replaced by logic "0" and logic "1," respectively, to prevent unintended logic transitions before confirmation that the DDR memory module 150 (FIG. 1) has transmitted a preamble. When the DDR memory module 150 issues a strobe preamble signal, the received and buffered strobe signals on the strobe circuit 250b are "unparked" or allowed to transition as described above until a strobe postamble is detected. Thereafter, the received and buffered strobe signals on the strobe circuit 250b are replaced by logic "0" and logic "1" to prevent unintended transitions of counters and other logic elements on the strobe circuit 250b.

The reference generator 370 generates a reference voltage that is between the termination voltage and the VHigh voltage level. The reference generator 370 forwards the reference voltage on connection 372 to the detector 410. When the strobe signals at the input of the strobe circuit 250b are inactive, i.e., when the strobe signals are not being driven by the DDR memory module 150 (FIG. 1), both the true strobe signal on connection 265 and the complimentary strobe signal on connection 267 will be at the termination voltage (VTT), which is below the reference voltage. Conversely, when the strobe signals at the input of the strobe circuit 250b are active, i.e., the strobe signals are being driven by the DDR memory module 150 (FIG. 1), one of the strobe signals will be greater than the reference voltage and the other strobe signal will be less than the reference voltage. The detector 410 identifies when one of the differential strobe signals is greater than the reference voltage on connection 372, and is thus able to discriminate between the case where the strobe signals are undriven and the case where the strobe signals are driven.

The preamble logic 400 receives an indication from the detector 410 when one of the differential strobe signals is greater than the reference voltage. In turn, the preamble logic 400 generates a preamble pulse, which is forwarded on connection 387 to the $1^{st}$ counter 500 and the strobe park circuit 700. The preamble pulse on connection 387 is an asynchronous reset signal. Details and operation of an embodiment of the preamble logic 400 and the detector 410 will be described below in association with the circuit illustrated in FIG. 4.

The $1^{st}$ counter 500 receives the preamble pulse and the strobe signals STB_P and STB_N received and buffered on the strobe circuit 250b and generates first and second strobe select output signals (P_STB_SEL[1:0] and N_STB_SEL[1:0]). The first and second strobe select output signals are coupled to respective inputs of the FIFO buffer 1000 (FIG. 3A). As indicated in FIG. 3B, the P_STB_SEL[1:0] signal is further provided at an input to the strobe park circuit 700. Details and operation of an embodiment of the $1^{st}$ counter 500 will be described below in association with the circuit illustrated in FIG. 5.

The $2^{nd}$ counter 600 receives the read data enable signal (RD_DATA_EN) and the differential ASIC-generated clock signals (RD_CLK and RD_CLK_N). The $2^{nd}$ counter 600 identifies RD_CLK signal rising transitions during the time that the read data enable signal is active to identify the data string length to be read from the DDR memory module 150 (FIG. 1). The $2^{nd}$ counter 600 generates a signal RD_DATA_COUNT[1:0] that is forwarded on connection 389 to the strobe park circuit 700. The $2^{nd}$ counter 600 also generates a registered representation of the RD_DATA_EN signal, RD_DATA_EN_REG that is forwarded on connection 391 to the strobe park circuit 700. Details and operation of an embodiment of the $2^{nd}$ counter 600 will be described below in association with the circuit illustrated in FIG. 6.

The strobe park circuit 700 receives the asynchronous preamble pulse, the complimentary strobe clock (STB_N), the RD_DATA_EN_REG signal, as well as an input from the strobe clock domain (i.e., the P_STB_SEL[1:0] signal) and an input from the ASIC clock domain (i.e., RD_DATA_COUNT[1:0] signal). The strobe park circuit 700 generates a control signal that is coupled to the control inputs of the first multiplexer 276, the second multiplexer 278, the third multiplexer 384, and the fourth multiplexer 386 to controllably "park" or modify the strobe signals STB_P and STB_N that are communicated to the FIFO buffer 1000 on the data circuit 200b (FIG. 3A). Details and operation of an embodiment of the strobe park circuit 700 will be described below in association with the circuit illustrated in FIG. 7 and the state diagram illustrated in FIG. 8.

The $1^{st}$ synchronizer 900 receives the SYNC_RESET signal from the memory controller 110 (FIG. 1) as well as differential clock signals from the ASIC-generated domain (i.e., the RD_CLK and RD_CLK_N signal) and generates synchronized count signals (i.e., the P_SYNC_COUNT[1:0] and N_SYNC_COUNT[1:0] signals). Details and operation of an embodiment of the $1^{st}$ synchronizer 900 will be described below in association with the circuit illustrated in FIG. 9.

Figure 4:
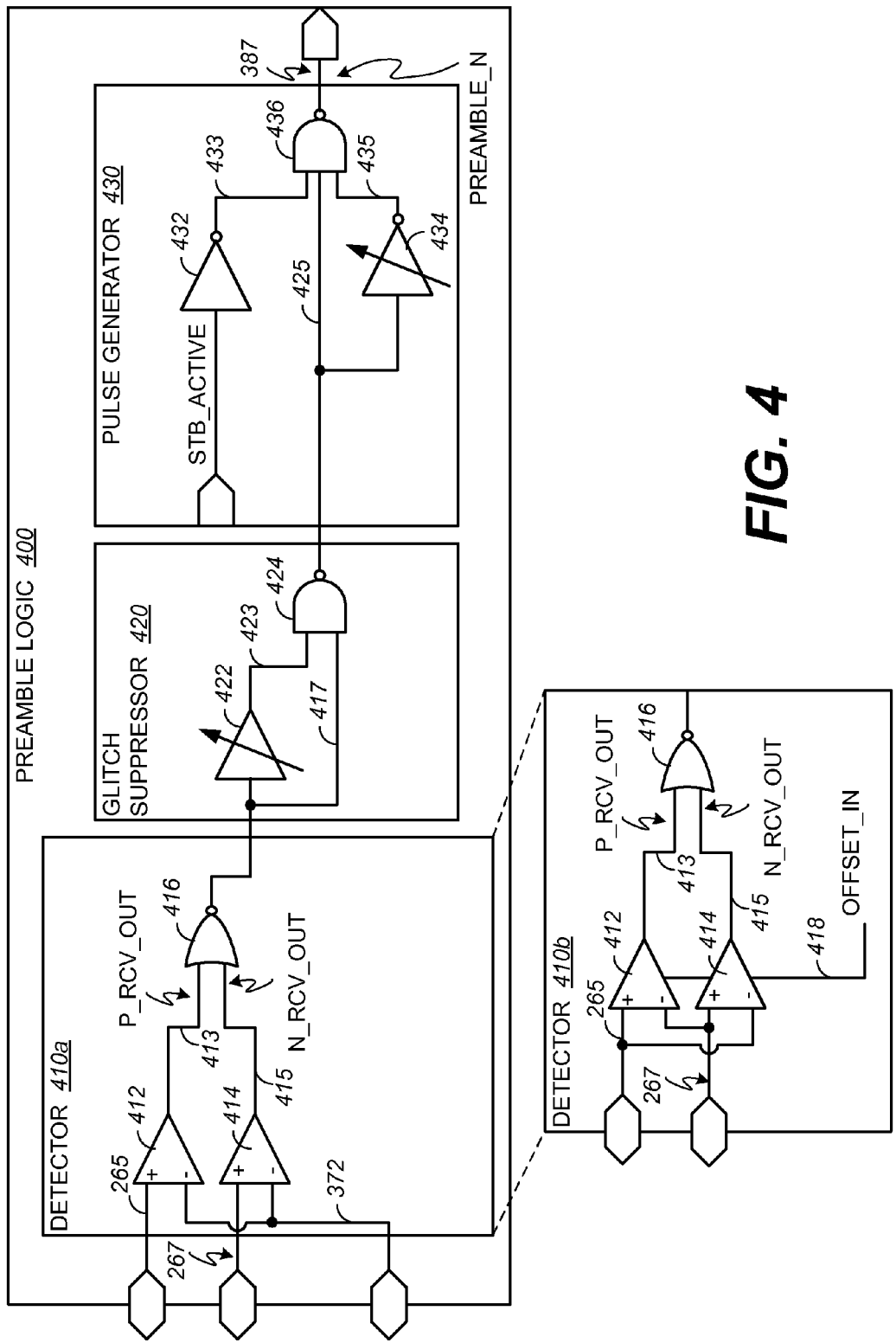
FIG. 4 is a schematic diagram of an embodiment of the preamble logic of FIG. 3B showing two different embodiments of a detector circuit.

FIG. 4 is a schematic diagram of an embodiment of the preamble logic 400 of FIG. 3B. The preamble logic 400 includes a detector 410a, a glitch suppressor 420 and a pulse generator 430. The detector 410a receives the strobe inputs from the DDR memory module 150 (FIG. 1) as well as a reference voltage and generates a preamble detection signal to the glitch suppressor 420. The detector 410a includes a true offset amplifier 412, a complimentary offset amplifier 414 and a NOR gate 416. The true strobe input, received on connection 265, is coupled to the non-inverting input of the true offset amplifier 412. The complimentary strobe input, received on connection 267, is coupled to the non-inverting input of the complimentary offset amplifier 414. The reference voltage on connection 372 is coupled to the inverting inputs of the true offset amplifier 412 and the complimentary offset amplifier 414. The output of the true offset amplifier 412 (labeled P_RCV_OUT) is coupled to a first input of the NOR gate on connection 413. The output of the complimentary offset amplifier 414 (labeled N_RCV_OUT) is coupled to the remaining input of the NOR gate by connection 415. In accordance with NOR logic, an active-low preamble detection signal is asserted on connection 417 when either the output of the true offset amplifier 412 is a logic "1" or the output of the complimentary offset amplifier 414 is a logic "1."

In an alternative embodiment, the detector 410a is replaced by a detector 410b having differential offset amplifiers connected to true and complementary strobe signals as in the detector 410a, but without a reference input from a reference generator. The detector 410b includes a true offset amplifier 412, a complimentary offset amplifier 414, and a NOR gate 416. The true strobe input, received on connection 265, is coupled to the non-inverting input of the true offset amplifier 412 and the inverting input of the complementary offset amplifier 414. The complimentary strobe input, received on connection 267, is coupled to the inverting input of the true offset amplifier 412 and the non-inverting input of the complimentary offset amplifier 414. As further illustrated, the offset voltage (OFFSET_IN) for such a differential offset amplifier is controllable (or programmable). The detector 410b obviates the need for the reference generator 370 (FIG. 3B).

The glitch suppressor 420 includes a delay element 422 and a NAND gate 424. Connection 417 couples the output of the detector 410a or 410b to the delay element 422 and to one of the two inputs of the NAND gate 424. The output of the delay element 422 is coupled to the remaining input of the NAND gate 424. In accordance with a control signal from the memory controller 110 (not shown), the delay element 422 adjusts or delays the signal on connection 417. When the strobe signals transition in opposite directions simultaneously, a race condition occurs between the P_RCV_OUT and N_RCV_OUT signals, which may cause a positive-going glitch to appear on connection 417 at the output of the NOR gate 416. If the glitch duration is less than the propagation delay of the delay element 422, the signal on connection 423 will remain at a logic "0" level while the glitch appears on the signal on connection 417. Also, the signal on connection 417 will remain at logic "0" while the glitch appears on the signal on connection 423. In both cases, at least one of the inputs to NAND gate 424 remains at logic "0" so that the output of NAND gate 424 remains at logic "1," and an incoming glitch does not propagate through to the output of NAND gate 424. In accordance with NAND logic, an inverted and glitch suppressed representation of the preamble detection signal on connection 417 (i.e., a logic "1" voltage level) is forwarded on connection 425 when either of the output of the detector 410a or 410b and the output of the delay element 422 are a logic "0."

The pulse generator 430 includes an inverter 432, an inverting delay element 434, and a NAND gate 436. A STB_ACTIVE signal, which is set to logic "1" when the strobe circuit is in output mode, is applied to the input of the inverter 432. The output of the inverter 432 is coupled to a first input of the NAND gate 436 via connection 433. The glitch suppressed representation of the preamble detection signal on connection 425 is coupled to a second input of the NAND gate 436 and to the inverting delay element 434. In accordance with a control signal from the memory controller 110 (not shown), the inverting delay element 434, adjusts or delays the signal on connection 425. The inverted and delayed version of the glitch suppressed output signal is forwarded via connection 435 to a third input of the NAND gate 436. In accordance with NAND logic, when the STB_ACTIVE input is set to logic "1" (strobe circuit is in output mode), the first input of NAND gate 436 is at logic "0" and a logic "1" is forwarded on connection 387. Also in accordance with NAND logic, an active-low preamble pulse responsive to the detector 410 and the glitch suppressor 420 is forwarded on connection 387 when the output of the inverter 432 on connection 433 is a logic "1" and either the output of the glitch suppressor on connection 425 or the output of the inverting delay element 434 on connection 435 is a logic "0."

The PREAMBLE_N signal or preamble pulse is used to asynchronously reset counters and registers in the strobe clock domain and to initialize a state machine in the strobe park circuit 700. The PREAMBLE_N signal pulse duration must be long enough to reset the registers in the state machine but short enough so that the pulse is deasserted by the time edges appear so that no edges are lost or unaccounted for by the counters. The PREAMBLE_N signal is forced to logic "0" by the STB_ACTIVE signal during a power up reset operation to initialize the state machine.

Figure 5:
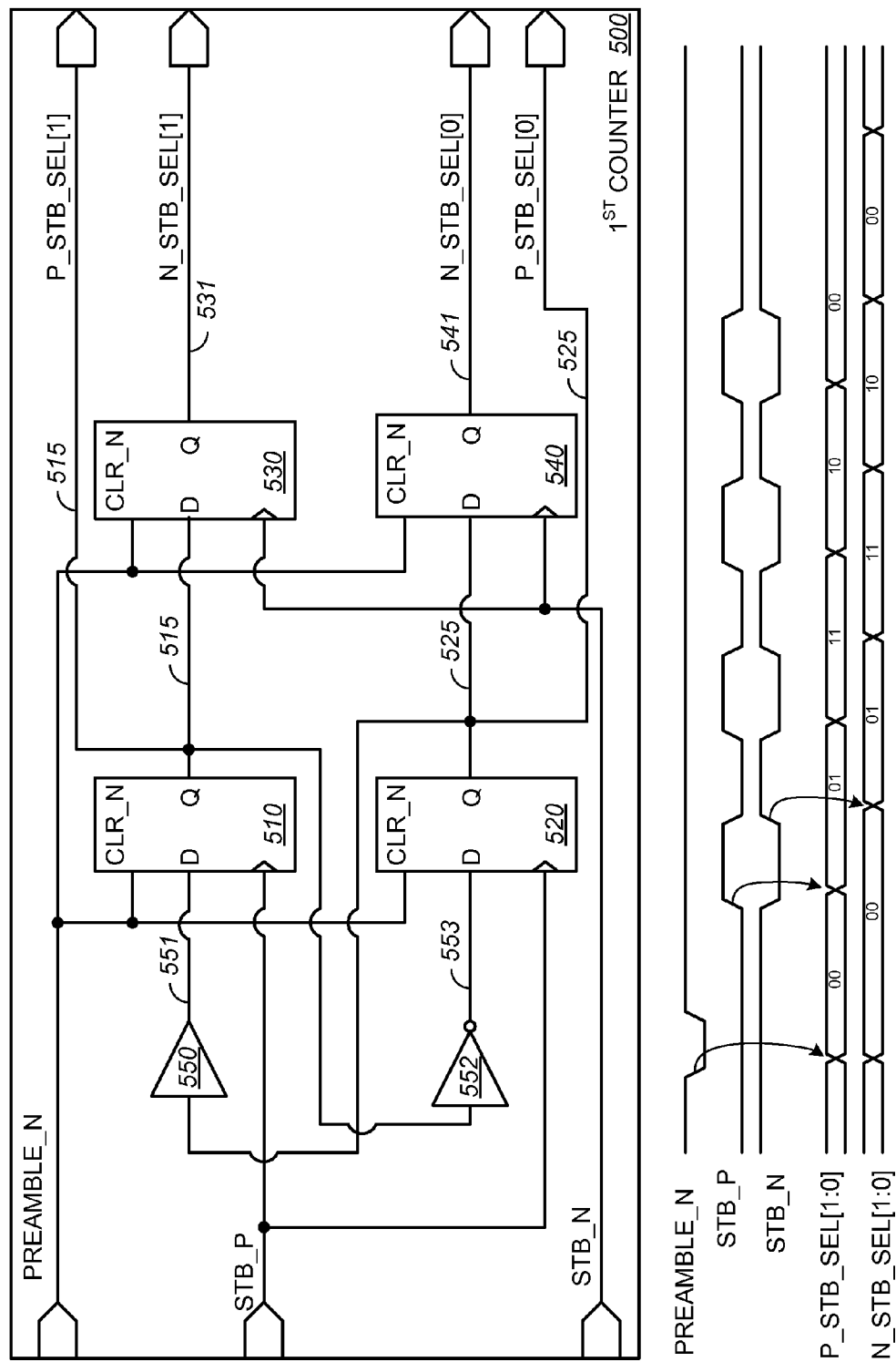
FIG. 5 is a schematic diagram of an embodiment of the first counter of FIG. 3B.

FIG. 5 is a schematic diagram of an embodiment of the $1^{st}$ counter 500 of FIG. 3B. The $1^{st}$ counter 500 includes a first register 510, a second register 520, a third register 530, a fourth register 540, a buffer 550 and an inverter 552. The $1^{st}$ counter 500 counts in gray code. Logically, the $1^{st}$ counter 500 can count in binary or in gray code. The gray code implementation is used because only one of the registers will transition in a given cycle. For a two-bit gray code counter, 50% fewer transitions are required than for a two-bit binary counter. This results in a power savings over a binary counter.

The first register 510 and the second register 520 generate and forward the P_STB_SEL[1:0] signals in accordance with the true strobe clock (i.e., STB_P). The P_STB_SEL[1] signal is communicated on connection 515 and the P_STB_SEL[0] signal is communicated on connection 525. The third register 530 and the fourth register 540 generate and forward the N_STB_SEL[1:0] signal in accordance with the complimentary strobe clock (i.e., STB_N). The N_STB_SEL[1] signal is communicated on connection 531 and the N_STB_SEL[0] signal is communicated on connection 541. The $1^{st}$ counter 500 is reset by the PREAMBLE_N signal, which is coupled to the CLR_N input of each of the first register 510, the second register 520, the third register 530 and the fourth register 540, respectively. The P_STB_SEL[0] signal is received and buffered by the buffer 550, which is coupled to the data input of the first register 510 by connection 551. In addition, the P_STB_SEL[1] signal is received and inverted by the inverter 552, which is coupled to the data input of the second register 520 by connection 553. The data output of the first register 510 is coupled to the data input of the third register 530 by connection 515. Similarly, the data output of the second register 520 is coupled to the data input of the fourth register 540 by connection 525. The data outputs of the first register 510 and the second register 520 together comprise the P_STB_SEL[1:0] bus. The data outputs of the third register 530 and the fourth register 540 together comprise the N_STB_SEL[1:0] bus.

Figure 6:
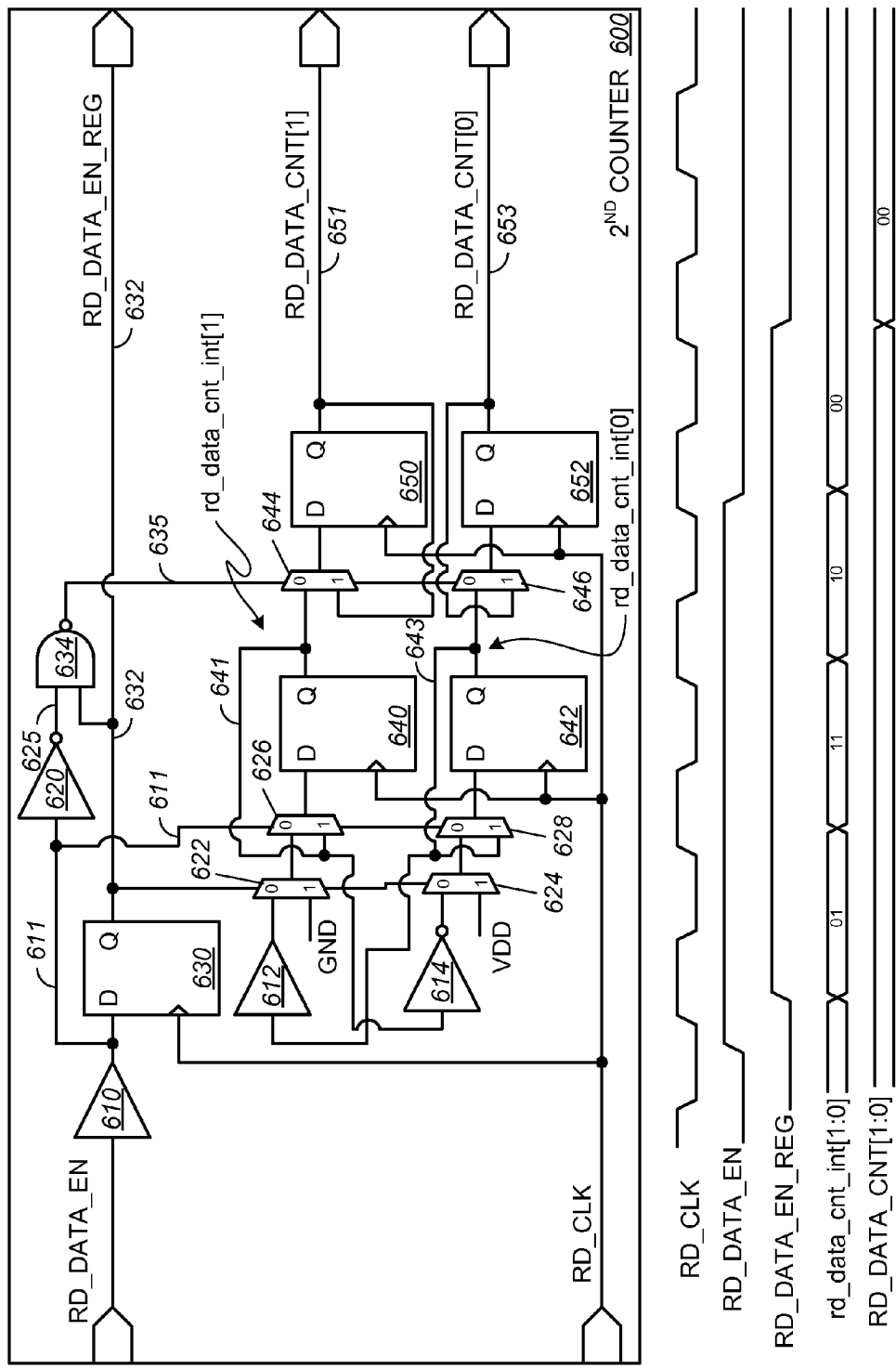
FIG. 6 is a schematic diagram illustrating an embodiment of the second counter of FIG. 3B.

FIG. 6 is a schematic diagram illustrating an embodiment of the $2^{nd}$ counter 600 of FIG. 3B. The $2^{nd}$ counter 600 receives a first voltage (i.e., VDD), a second voltage (i.e., electrical GND), a RD_DATA_EN signal and a RD_CLK signal. The $2^{nd}$ counter 600 generates a RD_DATA_EN_REG signal and RD_DATA_CNT[1:0] output signals.

The $2^{nd}$ counter 600 includes a NAND gate 634, a first buffer 610, a second buffer 612, a first inverter 614, and a second inverter 620. The $2^{nd}$ counter 600 further includes a first register 630, a second register 640, a third register 642, a fourth register 650 and a fifth register 652, as well as, a first multiplexer 622, a second multiplexer 624, a third multiplexer 626, a fourth multiplexer 628, a fifth multiplexer 644, and a sixth multiplexer 646. The second register 640 and the third register 642 of the $2^{nd}$ counter 600 count in gray code. Logically, the $2^{nd}$ counter 600 can count in binary or in gray code as long as both the first counter 500 and second counter 600 both count in a like manner (either binary or gray code). The gray code implementation is used because only one of the registers will transition in a given cycle. For a two-bit gray code counter, 50% fewer transitions are required than for a two-bit binary counter. This results in a power savings over a binary counter.

The RD_CLK signal is coupled to the clock input of each of the first register 630, the second register 640, the third register 642, the fourth register 650, and the fifth register 652. The RD_DATA_EN signal is applied at the input to the first buffer 610. The output of the first buffer 610 is coupled to the D input of the first register 630, the control inputs of the third multiplexer 626 and the fourth multiplexer 628 and the input of the second inverter 620 by the connection 611. The output of the first register 630 or the RD_DATA_EN_REG signal is coupled by connection 632 to each of a first input of the NAND gate 634 and the control inputs of the first multiplexer 622 and the second multiplexer 624. The output of the second inverter 620 is coupled by the connection 625 to the remaining input of the NAND gate 634. The output of the NAND gate 634 is coupled by the connection 635 to the control input of the fifth multiplexer 644 and the control input of the sixth multiplexer 646.

A first input of the first multiplexer 622 is coupled to logic "0" (electrical ground, GND). A first input of the second multiplexer 624 is coupled to logic "1" (supply voltage VDD). The connection 641, or rd_data_cnt_int[1] signal, couples an input of the first inverter 614 and a first input of the third multiplexer 626 to the data output of the second register 640, which is further coupled to a first input of the fifth multiplexer 644. The connection 643, or rd_data_cnt_int[0] signal, couples an input of the second buffer 612 and a first input of the fourth multiplexer 628 to the data output of the third register 642, which is further coupled to a first input of the sixth multiplexer 646. The output of the second buffer 612 is coupled to the remaining input of the first multiplexer 622. The output of the first multiplexer 622 is coupled to the remaining input of the third multiplexer 626. The output of the first inverter 614 is coupled to the remaining input of the second multiplexer 624. The output of the second multiplexer 624 is coupled to the remaining input of the fourth multiplexer 628. The fifth multiplexer 644 receives the data output of the fourth register 650 at the remaining data input. Similarly, the sixth multiplexer 646 receives the data output of the fifth register 652 at the remaining data input. The output of the fifth multiplexer 644 is coupled to the input of fourth register 650. The output of the sixth multiplexer 646 is coupled to the input of the fifth register 652. The output of the fourth register 650 propagates the RD_DATA_CNT[1] signal on connection 651. The output of the fifth register 652 propagates the RD_DATA_CNT[0] signal on connection 653. That is, the data outputs of the fourth register 650 and the fifth register 652 together comprise the RD_DATA_CNT[1:0] bus.

In operation, the RD_DATA_EN signal transitions from logic "0" to logic "1" at the initiation of a read operation. This transition causes the outputs of register 640 and register 642 to be initialized to logic "0" and logic "1," respectively. While RD_DATA_EN remains at logic "1," every rising edge of RD_CLK causes the gray code count stored in the second register 640 and the third register 642 to increment one step. If the RD_DATA_EN signal remains at logic "1" for more than 3 cycles of RD_CLK, the count stored in the second register 640 and the third register 642 "rolls over" to 00, and the count continues in gray code. When the RD_DATA_EN signal transitions from logic "1" to logic "0," the transition is detected by the logic of the second counter 600, and the count stored in the second register 640 and the third register 642 is propagated through the fifth multiplexer 644 and the sixth multiplexer 646 and stored in the fourth register 650 and the fifth register 652. The gray code count in the fourth register 650 and the fifth register 652 is propagated as the RD_DATA_CNT[1:0] output signals.

Figure 7:
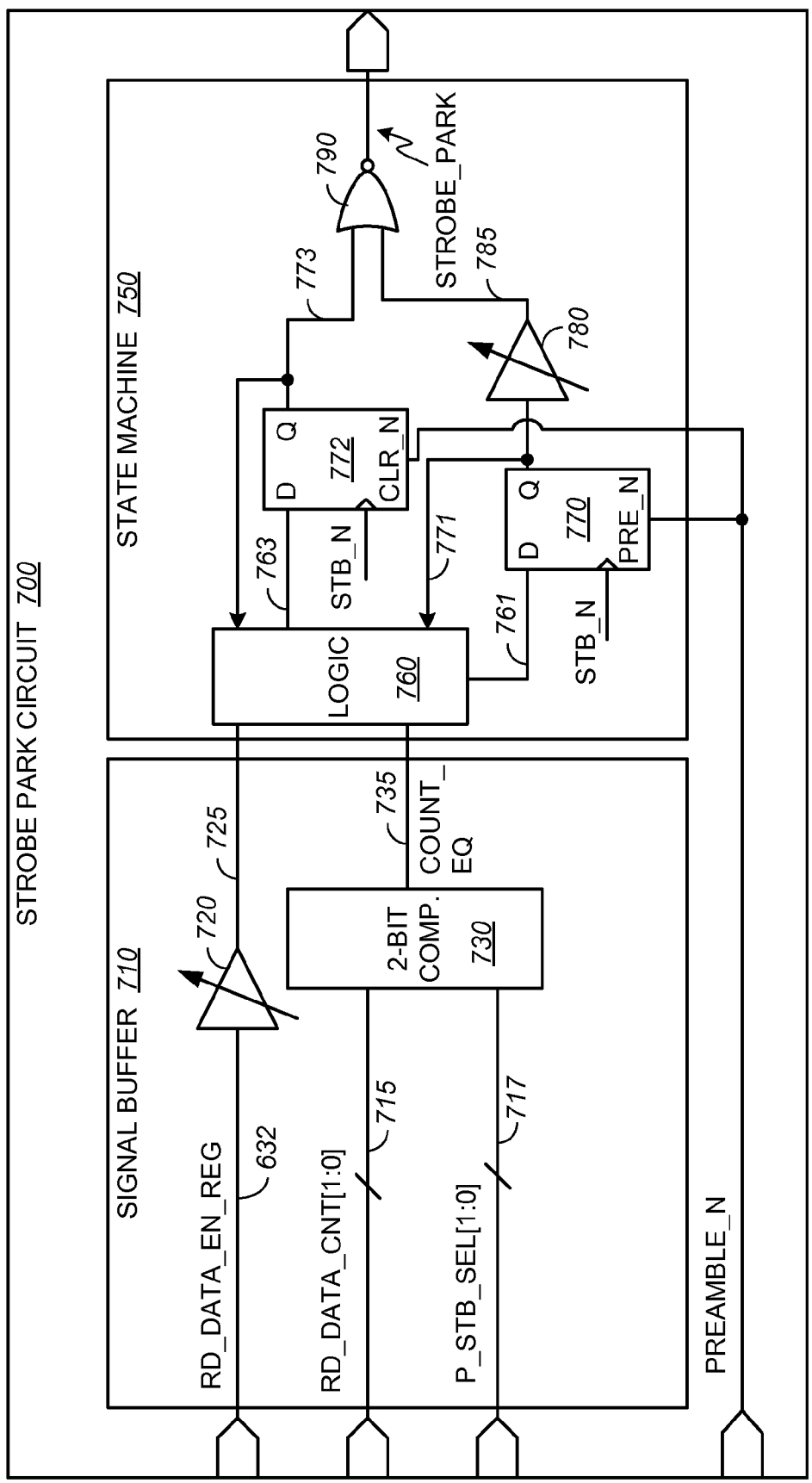
FIG. 7 is a schematic diagram illustrating an embodiment of the strobe park circuit of FIG. 3B.

FIG. 7 is a schematic diagram illustrating an embodiment of the strobe park circuit 700 of FIG. 3B. The strobe park circuit 700 includes a signal buffer 710 and a state machine 750. The signal buffer 710 receives a RD_DATA_EN_REG signal from the $2^{nd}$ counter 600 on connection 632, a RD_DATA_CNT[1:0] signal from the $2^{nd}$ counter 600, and a P_STB_SEL[1:0] signal from the $1^{st}$ counter 500.

The signal buffer 710 includes a delay element 720 and a 2-bit comparator 730. The RD_DATA_EN_REG input on connection 632 is coupled to the input of the delay element 720. The delay element 720 adjusts or delays the received data signal in accordance with a control signal from the memory controller 110. The adjusted or delayed output signal is coupled on connection 725 to the state machine 750.

The 2-bit comparator 730 of signal buffer 710 is a 2-bit wide count comparator. The RD_DATA_CNT[1:0] input is coupled on bus 715 to a first input port of the 2-bit comparator 730. The P_STB_SEL[1:0] input is coupled on bus 717 to a second input port of the 2-bit comparator 730. When the signals at the two input ports of the 2-bit comparator 730 are the same logic value, the output of the 2-bit comparator 730 propagates a logic "1" on connection 735 (COUNT_EQ signal) to the state machine 750. When the signals at the two input ports of the 2-bit comparator 730 are different logic values, the 2-bit comparator 730 propagates a logic "0" on connection 735 to the state machine 750.

The state machine 750 receives the delayed representation of the RD_DATA_EN_REG signal, the COUNT_EQ signal and the STB_N signal and generates a STROBE_PARK signal. The state machine 750 includes a logic element 760, a first register 770, a second register 772, a delay element 780 and a NOR gate 790. The PREAMBLE_N signal (i.e., the preamble pulse signal) is applied at the asynchronous PRE_N input of the first register 770 and the asynchronous CLR_N input of the second register 772. The PREAMBLE_N signal, as described above, is an asynchronous active-low signal generated by the preamble logic 400 that initializes the state machine 750. The logic element 760 receives the delayed representation of the RD_DATA_EN_REG signal on connection 725 and the COUNT_EQ signal on connection 735 and in accordance with internal logic provides a park next-state "0" data signal on connection to 761 to the data input of the first register 770 and a park next-state "1" data signal on connection 763 to the data input of the second register 772. The output of the second register 772 or the park state "1" signal is coupled to a first input of the NOR gate 790 and to the logic element 760 on connection 773. The output of the first register 770 or the park state "0" signal is coupled to an input of the delay element 780 and to the logic element 760 on connection 771. The delay element 780, in accordance with a control signal from the memory controller 110, adjusts or delays the signal on connection 771 before applying the delayed representation of the park state "0" signal to the remaining input of the NOR gate 790 on connection 785. The NOR gate 790 generates the STROBE_PARK signal, which as described above is used to controllably replace the received and buffered strobe inputs on the strobe circuit 250b by switching dedicated multiplexers that forward fixed logic levels in place of the STB_P and STB_N signals.

Figure 8:
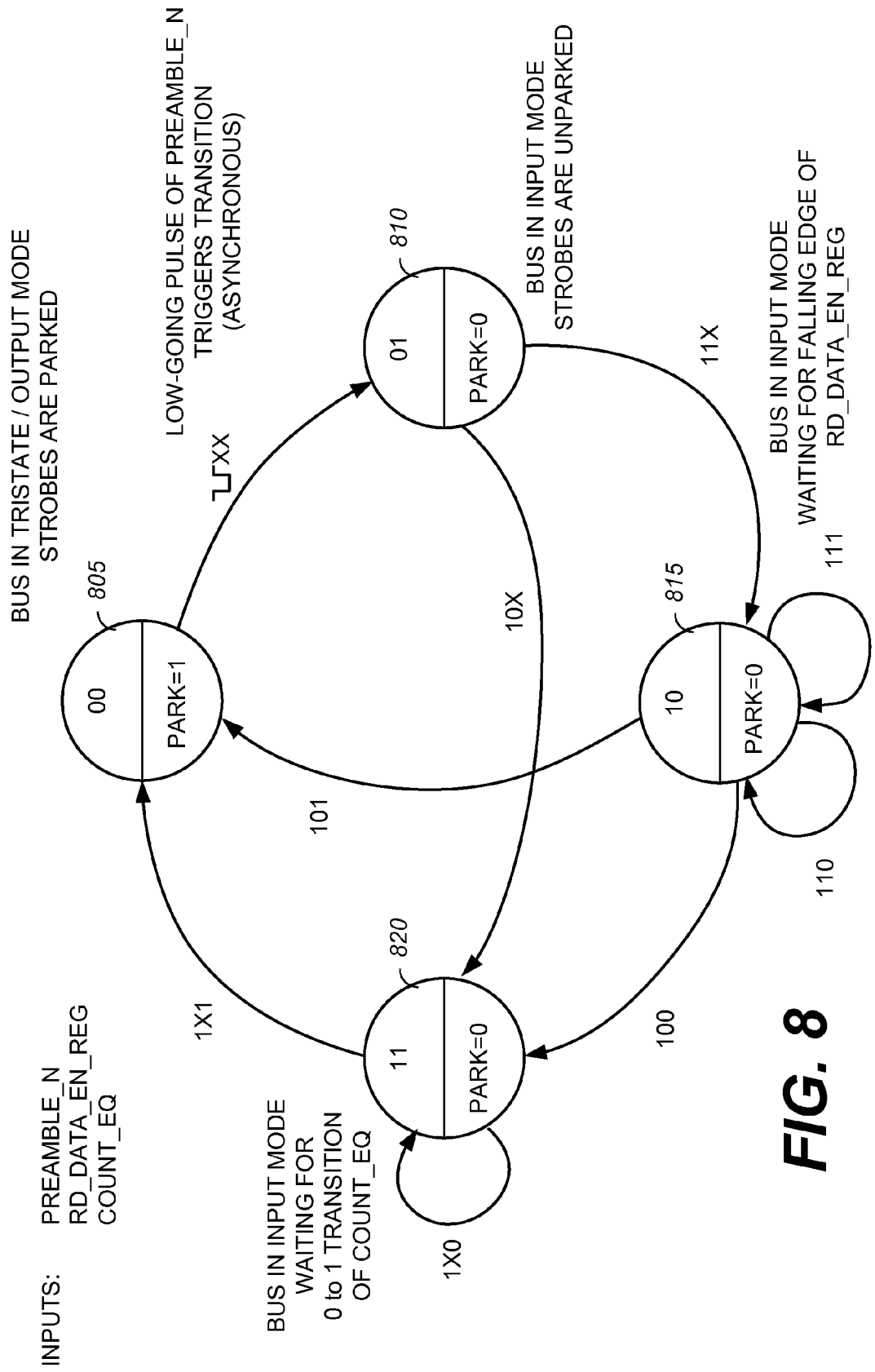
FIG. 8 is a state diagram illustrating the operation of the strobe park circuit of FIG. 7.

FIG. 8 is a state diagram illustrating the operation of the strobe park circuit 700 of FIG. 7. As indicated in the state diagram of FIG. 8, the strobe park circuit 700 operates in accordance with three inputs, the PREAMBLE_N signal, the RD_DATA_EN_REG signal and the COUNT_EQ signal. Each of the state transition arrows in the state diagram are identified by the three input signals in order. Four states are identified. In a first state 805, designated "00," the data bus is in a tristate or output mode and the strobe signals are replaced or "parked." As indicated by the state transition arrow that exits the first state 805, a low-going pulse of the PREAMBLE_N signal causes an asynchronous transition to a second state 810, designated "01," where the data bus is in an input mode and the strobe signals (i.e., STB and STB_N) are enabled or "unparked." After this asynchronous transition, the state machine 750 operates synchronously in the STB_N domain, with the unparked STB_N signal clocking registers 770 and 772 until the state machine finally reaches the first state 805. Once the state machine 750 has entered the second state 810, the state machine 750 remains in the second state 810 until the first rising edge of STB_N. Thereafter, two transitions are possible. When the RD_DATA_EN_REG signal is a logic "1" value, the state machine 750 transitions to a third state 815, designated "10," where the data bus is in input mode and the state machine 750 waits for a falling transition of the RD_DATA_EN_REG signal. Otherwise, when the RD_DATA_EN_REG signal is a logic "0" value, the state machine 750 transitions to a fourth state 820, designated "11," where the data bus is in input mode and the state machine 750 is waiting for a rising or "0" to "1" transition of the COUNT_EQ signal.

In FIG. 8, certain state transitions are not shown because they represent illegal transitions that cannot occur during normal operation of the state machine 750. These illegal transitions originate from either the second state 810, the third state 815, or the fourth state 820 under the condition that the PREAMBLE_N input receives a low-going pulse. Under normal operation of the state machine 750, the PREAMBLE_N input can only be pulsed when a strobe preamble is detected, which can only occur when the state machine is in the first state 805.

Once the state machine 750 has entered the third state 815, the state machine 750 remains in the third state 815 for at least one clock cycle. Thereafter, three transitions are possible. When the COUNT_EQ signal is a logic "1" value and the RD_DATA_EN_REG signal is a logic "0" value, the state machine 750 transitions back to the first state 805, where the strobe signals are replaced or "parked" and the data bus is in an undriven or output mode. When the COUNT_EQ signal is a logic "0" value and the RD_DATA_EN_REG signal is a logic "0" value, the state machine 750 transitions to the fourth state 820. Otherwise, as indicated by the two smaller arrows surrounding the third state 815, if the RD_DATA_EN_REG signal remains at a logic "1" value, the state machine 750 remains in the third state 815.

Once the state machine 750 has entered the fourth state 820, the state machine 750 remains in the fourth state 820 for at least one clock cycle. Thereafter, two transitions are possible. When the state machine 750 detects a rising or "0" to "1" transition of the COUNT_EQ signal, the state machine 750 transitions back to the first state 805 or state "00". This state transition indicates the arrival of the postamble at the strobe input pins. Otherwise, as indicated by the arrow surrounding the fourth state 820, if the COUNT_EQ input remains at a logic "0" level, the state machine 750 remains in the fourth state 820.

The RD_DATA_EN_REG input of state machine 750 transitions synchronously with respect to the RD_CLK input. Therefore, the RD_DATA_EN_REG signal will meet setup and hold requirements with respect to the RD_CLK signal. The RD_DATA_COUNT[1:0] input to the comparator 730 also is synchronous with respect to the RD_CLK signal and will therefore meet setup and hold requirements with respect to the RD_CLK signal. The P_STB_SEL[1:0] input is synchronous with respect to the STB signal and therefore will meet setup and hold requirements with respect to the STB signal. The STB_P clock signal and the STB_N clock signal are complements of each other and therefore have a well-defined synchronous relationship with each other. Specifically, the STB_P and STB_N signals have a phase offset of 180 degrees. Therefore the output of the comparator 730 may be either asynchronous with respect to the STB_N signal in the case where RD_DATA_COUNT[1:0] signal transitions, in which case the COUNT_EQ signal may not meet setup or hold requirements to register 770 and register 772. Also, the output of the comparator 730 may be synchronous with respect to the STB_N signal in the case where P_STB_SEL [1:0] transitions, in which case the COUNT_EQ signal will meet setup and hold requirements to register 770 and register 772. Since there is a possibility of the inputs to register 770 and register 772 not meeting setup or hold requirements, the logic of state machine 750 is designed to adequately respond to this and other logic hazards.

Since the PREAMBLE_N signal is asynchronous with respect to the STB_N signal, the PREAMBLE_N input may not meet setup and hold requirements with respect to the STB_N signal at the PRE_N and CLR_N inputs to register 770 and register 772, respectively. However, the PREAMBLE_N input will only become active when the state machine 750 is in the first state 805, which guarantees that STB_P and STB_N are parked. Since STB_N is parked and therefore not transitioning, the PREAMBLE_N input is guaranteed to meet setup and hold requirements with respect to STB_N as long as the PREAMBLE_N pulse duration is sufficiently small that the PREAMBLE_N input returns to logic "1" before the first rising edge of STB_N arrives at register 770 and register 772.

There is a logic hazard during the transition from the second state 810 to the third state 815, where the register 770 transition from logic "1" to logic "0" at the same time that register 772 transitions from logic "0" to logic "1." Since the STROBE_PARK output is the logic NOR combination of these two signals, the STROBE_PARK output could glitch if the transition at the output of register 770 (logic "1" to logic "0") propagates faster than the output of register 772 (logic "0" to logic "1"). The delay element 780 prevents a glitch from appearing on the STROBE_PARK output during this transition by causing the logic "0" to logic "1" transition of register 770 to propagate to the first input of NOR gate 790 on connection 773 before the logic "1" to logic "0" transition of register 772 propagates to the second input of NOR gate 790 on connection 785.

A logic hazard exists when the state machine 750 is in the second state 810 and transitions to either the third state 815 or the fourth state 820, based on the RD_DATA_EN_REG input. For this transition, the logic for the input of register 772 guarantees a transition from logic "0" to logic "1," so the input to register 772 will meet setup and hold requirements with respect to the STB_N signal. Also for this transition, the logic for the input of register 770 will either cause register 770 to transition from logic "0" to logic "1" or cause register 770 to remain at logic "1," depending on the value of the RD_DATA_EN_REG input signal. Since the RD_DATA_EN_REG input is asynchronous with respect to the STB_N signal, the register 770 may be placed in a metastable state for a short time, this time being much less than a clock cycle, and register 770 will resolve to a logic "0" or a logic "1" for the state transition. Since the output of register 772 always transitions to logic "1" and the output of register 770 transitions to either logic "0" or logic "1," the state machine will transition to either the third state 815 or the fourth state 820. Since both of these states are valid transitions and the STB_PARK output is unaffected, the operation of the state machine responds adequately in all cases to this logic hazard.

The state machine 750 is designed to respond adequately to inputs (e.g., the RD_DATA_EN_REG signal) in the RD_CLK domain and strobe inputs in the strobe (e.g., STB and STB_N) domain. However, there are constraints on the timing relationship between these inputs. If the strobe preamble input arrives before the RD_DATA_EN_REG input, the preamble detect circuit 400 will be disabled during the arrival of the preamble signal and the state machine 750 will fail to transition from the first state 805 to the second state 810 during the strobe preamble, thus causing the state machine 750 to be in an invalid state. This is referred to as the early timing constraint. If two read data bursts occur with minimal temporal separation (one clock cycle) and the strobe preamble input arrives several clock cycles subsequent to the arrival of the RD_DATA_EN_REG input, then the rising transition of the RD_DATA_EN_REG signal for the second burst may arrive at the state machine 750 during the second state 810 and cause an incorrect transition from the second state 810 to the third state 815, instead of a correct transition from the second state 810 to the fourth state 820. This is referred to as the late timing constraint. To restate, the early timing constraint requires that the RD_DATA_EN_REG input must arrive at the state machine 750 before the PREAMBLE_N pulse input at the state machine 750. The late timing constraint requires that the state machine 750 transitions into the third state 815 for the current read burst before the RD_DATA_EN_REG signal for the next read burst arrives at the state machine 750. In practice, this gives a timing window of greater than 2 clock cycles width to define the timing relationship between the RD_DATA_EN_REG and PREAMBLE_N inputs to the state machine 750. The ideal (center point) of the timing window is when the PREAMBLE_N pulse input arrives approximately 1 clock cycle after the RD_DATA_EN_REG input transitions from logic "0" to logic "1".

For example, upon encountering an early input of a data signal (i.e., an early transition of the P_STB_SEL from the $1^{st}$ counter 500), the state machine 750 will, in accordance with the state diagram of FIG. 8, start at the first state 805 or state "00." Upon receipt of the low-going pulse of the PREAMBLE_N signal, the state machine 750 transitions to the second state 810 or state "01," where the state machine 750 remains until a rising edge of the STB_N signal is detected. Upon detection of the rising edge of the STB_N signal, the state machine 750 transitions to the third state 815 or state "10," where the state machine 750 remains until receipt of the "0" to "1" transition of the COUNT_EQ signal. Thereafter, the state machine 750 transitions back to the first state 805 or state "00."

Furthermore, the strobe park circuit 700 tolerates metastability on transitions from the "10" state to either the "00" state or the "11" state. The registered signals RD_DATA_EN_REG, RD_DATA_CNT[1:0], and P_STB_SEL[1:0] are never metastable. Under certain conditions, there is a race condition between a transition on RD_DATA_EN_REG (in the core clock domain) and a transition of COUNT_EQ when RD_DATA_CNT[1:0] transitions (also in the core clock domain). When this occurs, the delay element 720 ensures the COUNT_EQ signal updates before the delay adjusted version of the RD_DATA_EN_REG signal is propagated to the state machine on connection 725. Consequently, on a given transition, at least one of the delay adjusted version of the RD_DATA_EN_REG signal on connection 725 and the COUNT_EQ signal on connection 735 will meet setup and hold timing requirements with respect to STB_N at the inputs to the state machine 750.

The COUNT_EQ and RD_DATA_EN_REG signals define four possibilities for metastable logic hazards when the state machine 750 transitions from the third state 815 to either the third state 815, the fourth state 820, or the first state 805. In a first combination, the COUNT_EQ signal is metastable and the RD_DATA_EN_REG signal is a logic "1" value. In a second combination, the RD_DATA_EN_REG signal is metastable and the COUNT_EQ signal is a logic "0" value. In a third combination, the COUNT_EQ signal is metastable and the RD_DATA_EN_REG signal is a logic "0" value. In a fourth combination, the RD_DATA_EN_REG signal is metastable and the COUNT_EQ signal is a logic "1" value. The first combination is rendered stable as indicated by the short arrows surrounding the third state 815 that indicate that either data value of COUNT_EQ when the RD_DATA_EN_REG signal is a logic "1" value results in the state machine 750 maintaining the third state 815. The second combination is rendered stable as indicated by the transition arrow labeled "100" that indicates a transition from the third state 815 to the fourth state 820 and the leftmost arrow in the vicinity of the third state 815 that shows that a "110" combination of the PREAMBLE_N, RD_DATA_EN_REG, and COUNT_EQ signals results in the state machine 750 maintaining the third state 815, either transition being a valid state transition. The third combination cannot occur. When the RD_DATA_EN_REG signal is a logic "0" value, the RD_DATA_CNT[1:0] input to the comparator 730 is non-transitioning, so the COUNT_EQ signal updates synchronously on STB_P signal rising transitions. The fourth combination can occur, but it is a violation of the "early" timing constraint. That is, where the strobe signals arrive too early and the falling edge of the RD_DATA_EN_REG signal misses the setup of the last STB_N rising transition.

Figure 9:
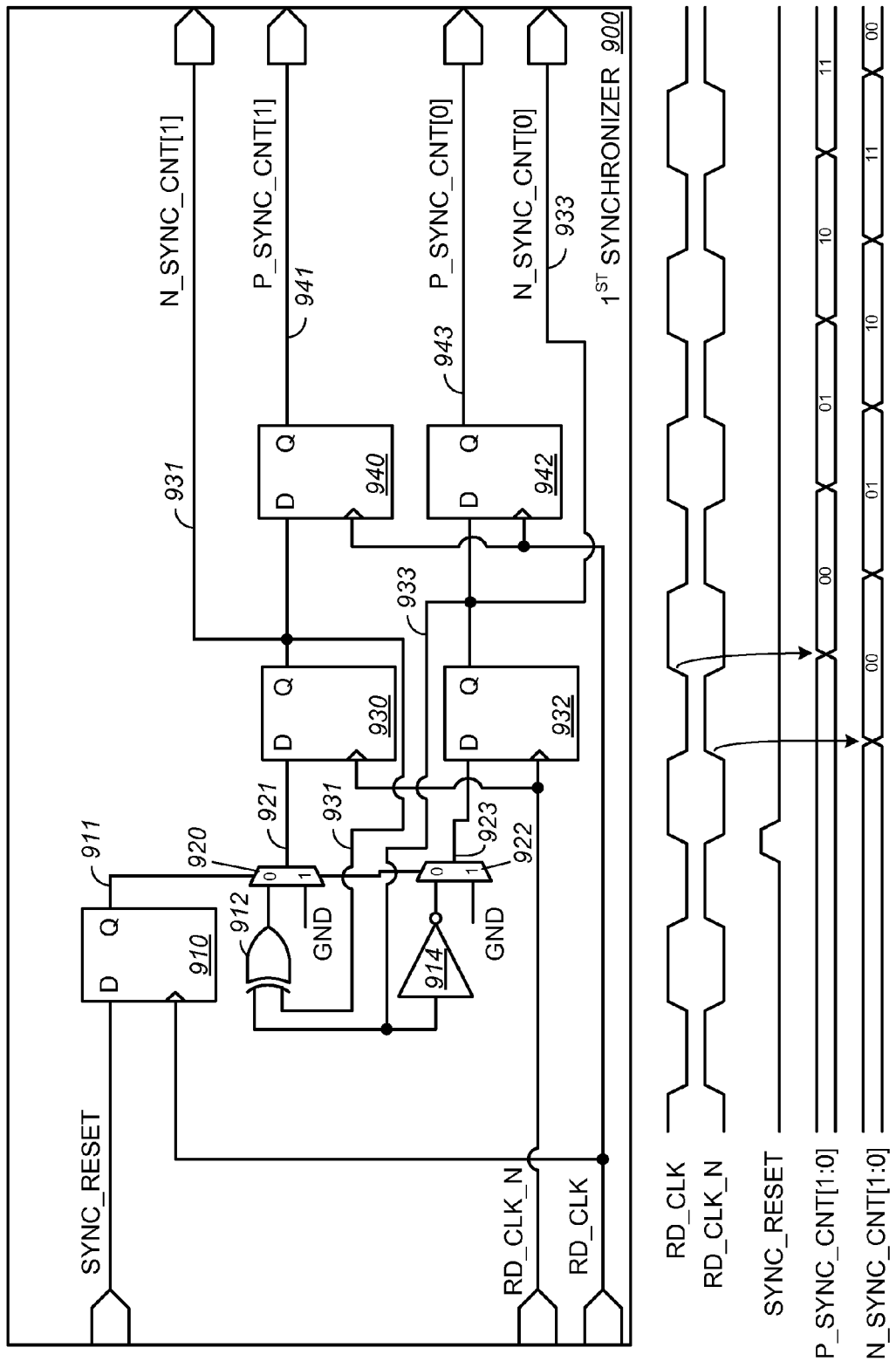
FIG. 9 is a schematic diagram of an embodiment of the first synchronizer of FIG. 3B.

FIG. 9 is a schematic diagram of an embodiment of the 1$^{st}$ synchronizer 900 of FIG. 3B. The 1$^{st}$ synchronizer 900 is a data synchronizer that operates in accordance with the RD_CLK. That is, the 1$^{st}$ synchronizer operates in an ASIC-generated clock domain. The 1$^{st}$ synchronizer 900 receives a SYNC_RESET control signal from the memory controller 110 and the RD_CLK and RD_CLK_N clock signals and generates a P_SYNC_CNT[1:0] signal and a N_SYNC_CNT [1:0] signal. The 1$^{st}$ synchronizer 900 includes a first register 910, a second register 930, a third register 932, a fourth register 940 and a fifth register 942. In addition, the 1$^{st}$ synchronizer 900 includes a XOR gate 912, an inverter 914, a first multiplexer 920 and a second multiplexer 922.

The first register 910, the fourth register 940 and the fifth register 942 operate in accordance with the RD_CLK signal. Conversely, the respective clock inputs of the second register 930 and the third register 932 are coupled to the RD_CLK_N signal. The first register 910 receives the SYNC_RESET signal at a data input and forwards a registered version of the SYNC_RESET signal on connection 911 to the control inputs of the first multiplexer 920 and the second multiplexer 922. A respective first data input of the first multiplexer 920 and the second multiplexer 922 is coupled to a logic "0" level (e.g., electrical ground or GND). An input of the inverter 914, a first input of the XOR gate 912 and the input of the fifth register 942 are coupled to the output of the third register 932 by the connection 933, labeled N_SYNC_CNT[0]. A second input of the XOR gate 912 and the input of the fourth register 940 are coupled to the output of the second register 930 by the connection 931, labeled N_SYNC_CNT[1]. The output of the XOR gate 912 is coupled to a second input of the first multiplexer 920. The output of the first multiplexer 920, operating in accordance with the SYNC_RESET signal, controllably selects and forwards the output of the XOR gate 912 on connection 921 to the input of the second register 930. The output of the inverter 914 is coupled to a second input of the second multiplexer 922. The output of the second multiplexer 922, operating in accordance with the SYNC_RESET signal, controllably selects and forwards the output of the inverter 914 on connection 923 to the input of the third register 932. The third register 932 generates and forwards the N_SYNC_CNT[0] signal on connection 933, which is received at the data input of the fifth register 942. The second register 930 generates and forwards the N_SYNC_CNT[1] signal on connection 931, which is received at the input of the fourth register 940. The fourth register 940 generates and forwards the P_SYNC_CNT[1] signal on connection 941 and the fifth register 942 generates and forwards the P_SYNC_CNT[0] signal on connection 943. The fourth register 940 and the fifth register 942 operate in accordance with the RD_CLK signal. Upon receipt of a SYNC_RESET pulse, the 1$^{st}$ synchronizer 900 generates a N_SYNC_CNT[1:0] signal that counts the number of rising transitions of the RD_CLK_N signal and a P_SYNC_CNT[1:0] signal that counts the number of rising transitions of the RD_CLK signal.

Figure 10:
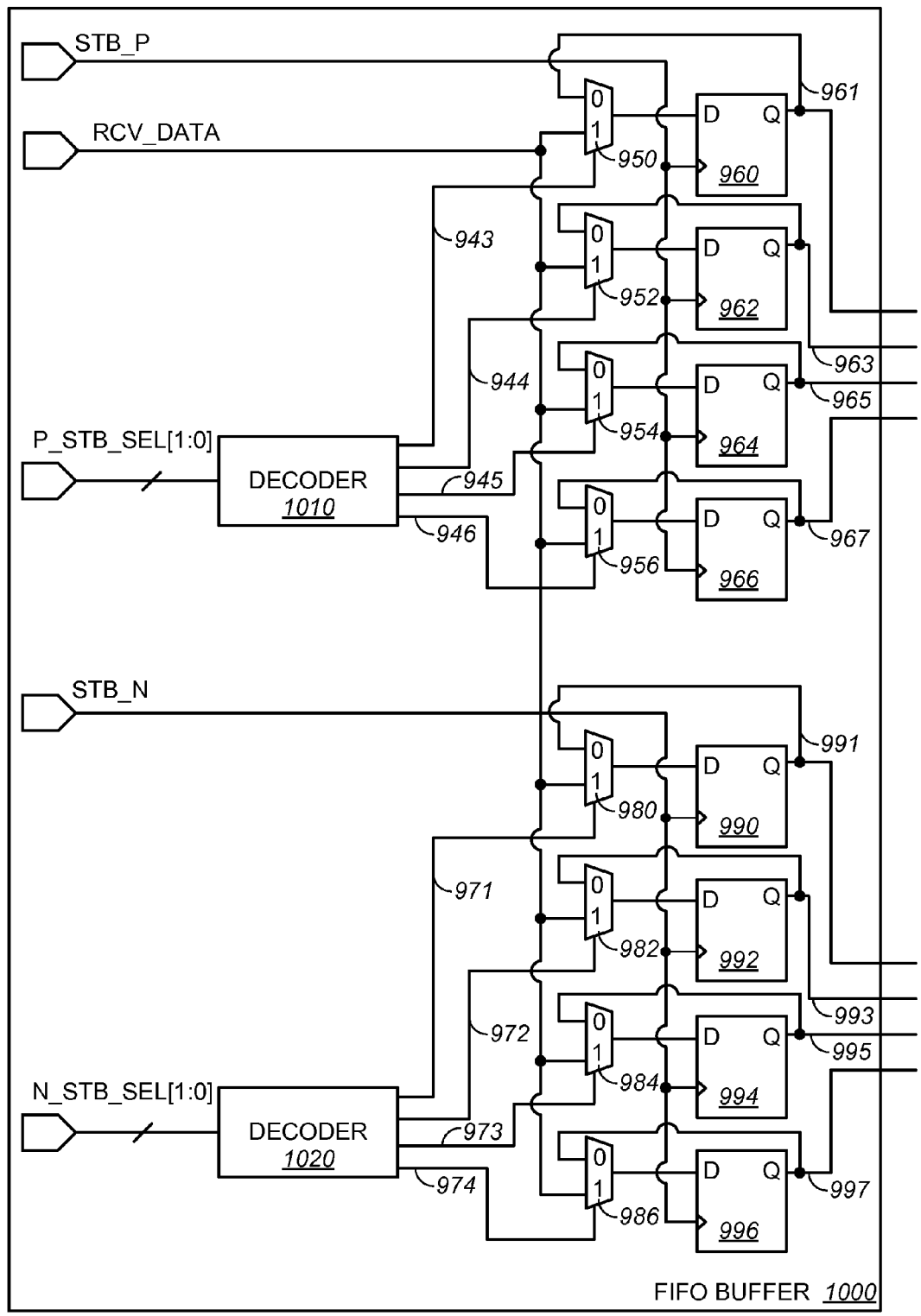
FIG. 10 is a schematic diagram of an embodiment of the FIFO buffer of FIG. 3A.

FIG. 10 is a schematic diagram of an embodiment of the FIFO buffer 1000 of FIG. 3A. The FIFO buffer 1000 coordinates the transfer of data from the receiver 310 (FIG. 3A) on the data circuit 200b in the strobe clock domain. The FIFO buffer 1000 includes a first decoder 1010, a second decoder 1020, a first set of four multiplexers 950, 952, 954, 956, a second set of four multiplexers 980, 982, 984, 986, a first set of four registers 960, 962, 964, 966 and a second set of four registers 990, 992, 994, 996. The STB_P clock signal is coupled to the respective clock inputs of the first set of four registers 960, 962, 964, 966. The STB_N clock signal is coupled to the respective clock inputs of the second set of four registers 990, 992, 994, 996. The RCV_DATA signal is coupled to a respective first data input of each of the eight multiplexers 950, 952, 954, 956, 980, 982, 984, and 986. The respective outputs of the eight multiplexers 950, 952, 954, 956, 980, 982, 984, and 986 are coupled to the input of a corresponding one of the eight registers 960, 962, 964, 966, 990, 992, 994, and 996.

The respective outputs of the eight registers are forwarded to the 2$^{nd}$ synchronizer 1100 and to the remaining data input of the corresponding multiplexer. Connection 961 couples the output of the first register 960 to the remaining data input of the first multiplexer 950. Connection 963 couples the output of the second register 962 to the remaining data input of the second multiplexer 952. Connection 965 couples the output of the third register 964 to the remaining data input of the third multiplexer 954. Connection 967 couples the output of the fourth register 966 to the remaining data input of the fourth multiplexer 956. Similarly, connection 991 couples the output of the fifth register 990 to the remaining data input of the fifth multiplexer 980. Connection 993 couples the output of the sixth register 992 to the remaining data input of the sixth multiplexer 982. Connection 995 couples the output of the seventh register 994 to the remaining data input of the seventh multiplexer 984. Connection 997 couples the output of the eighth register 996 to the remaining data input of the eighth multiplexer 986.

The decoder 1010 receives the P_STB_SEL[1:0] signal, which identifies which of the four data values is being received on the RCV_DATA signal. When the decoder 1010 determines that a first or "00" data value is being received, the first decoder 1010 sends a control signal on the connection 943 that directs the first multiplexer 950 to select one of the RCV_DATA or the output of the first register 960. When the decoder 1010 determines that a second or "01" data value is being received, the first decoder 1010 sends a control signal on the connection 944 that directs the second multiplexer 952 to select one of the RCV_DATA or the output of the second register 962. When the decoder 1010 determines that a third or "10" data value is being received, the first decoder 1010 sends a control signal on the connection 945 that directs the third multiplexer 954 to select one of the RCV_DATA or the output of the third register 964. When the decoder 1010 determines that a fourth or "11" data value is being received, the first decoder 1010 sends a control signal on the connection 946 that directs the fourth multiplexer 956 to select one of the RCV_DATA or the output of the fourth register 966.

The second decoder 1020 receives the N_STB_SEL[1:0] signal, which identifies which of the four data values is being received on the RCV_DATA signal. When the second decoder 1020 determines that a first or "00" data value is being received, the second decoder 1010 sends a control signal on the connection 971 that directs the fifth multiplexer 980 to select one of the RCV_DATA or the output of the fifth register 990. When the second decoder 1020 determines that a second or "01" data value is being received, the second decoder 1020 sends a control signal on the connection 972 that directs the sixth multiplexer 982 to select one of the RCV_DATA or the output of the sixth register 992. When the second decoder 1020 determines that a third or "10" data value is being received, the second decoder 1020 sends a control signal on the connection 973 that directs the seventh multiplexer 984 to select one of the RCV_DATA or the output of the seventh register 994. When the second decoder 1020 determines that a fourth or "11" data value is being received, the second decoder 1020 sends a control signal on the connection 974 that directs the eighth multiplexer 986 to select one of the RCV_DATA or the output of the eighth register 996.

Figure 11:
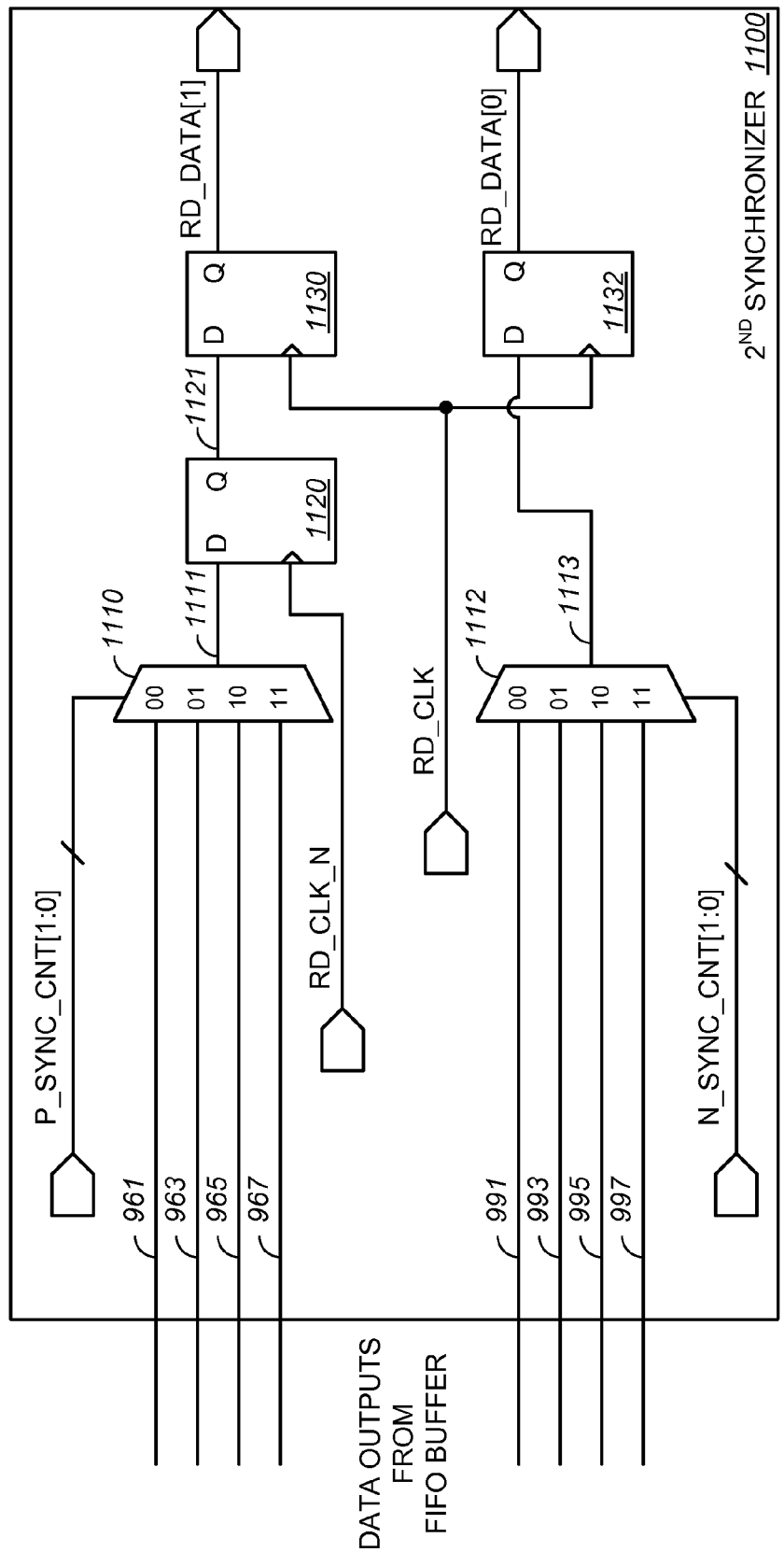
FIG. 11 is a schematic diagram of an embodiment of the second synchronizer of FIG. 3A.

FIG. 11 is a schematic diagram of an embodiment of the $2^{nd}$ synchronizer 1100 of FIG. 3A. The $2^{nd}$ synchronizer operates in accordance with an ASIC-generated clock signal. The $2^{nd}$ synchronizer 1100 receives the RD_CLK and RD_CLK_N inputs, as well as the P_SYNC_CNT[1:0] and N_SYNC CNT[1:0] signals generated by the $1^{st}$ synchronizer 900 and generates a RD_DATA[0] signal and a RD_DATA[1] signal. The $2^{nd}$ synchronizer 1100 includes a first multiplexer 1110, a second multiplexer 1112, a first register 1120, a second register 1130 and a third register 1132. The first multiplexer 1110, operating in accordance with the P_SYNC_CNT[1:0] signal, selectively applies the signal from one of connection 961, connection 963, connection 965, or connection 967 at connection 1111, which is coupled to the input of the first register 1120. The first register 1120 operates in accordance with the RD_CLK_N signal and forwards the selected data signal on connection 1121 to the input of the second register 1130. The second register 1130 and the third register 1132 operate in accordance with the RD_CLK signal. The second multiplexer 1112, operating in accordance with the N_SYNC_CNT[1:0] signal, selectively applies the signal from one of connection 991, connection 993, connection 995, or connection 997 at connection 1113, which is coupled to the input of the third register 1132. As shown in FIG. 11, the second register 1130 forwards the RD_DATA[1] signal and the third register 1132 forwards the RD_DATA[0] signal.

Figure 12:
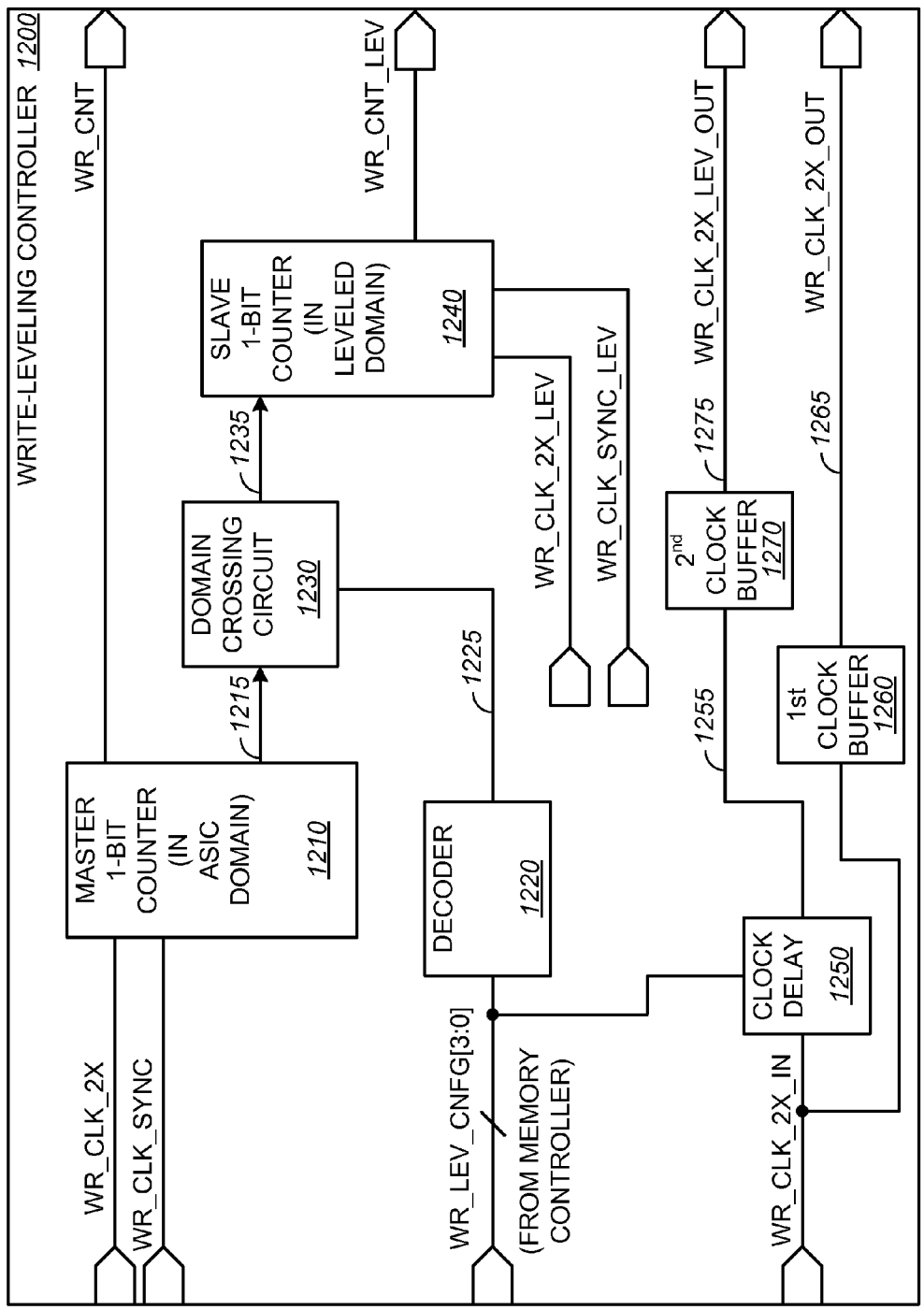
FIG. 12 is a schematic diagram illustrating an embodiment of the write-leveling controller of FIG. 1.

FIG. 12 is a schematic diagram illustrating an embodiment of the write-leveling controller 1200 of FIG. 1. The write-leveling controller 1200 receives and applies a WR_CLK_2X_IN, a WR_CLK_2X signal, a WR_CLK_2X_LEV signal (i.e., a write leveled or delayed version of the WR_CLK_2X signal), a WR_CLK_SYNC signal, a WR_CLK_SYNC_LEV signal (i.e., a write leveled or delayed version of the WR_CLK_SYNC signal and a WR_LEV_CNFG signal. The write-leveling controller 1200 generates WR_CLK_2X_OUT, WR_CLK_2X_LEV_OUT, WR_CNT, and WR_CNT_LEV output signals.

The write-leveling controller 1200 includes a master 1-bit counter 1210, a decoder 1220, a domain-crossing circuit 1230, a slave 1-bit counter 1240, a clock delay element 1250, a first clock buffer 1260, and a second clock buffer 1270. The write-leveling controller 1200 receives a WR_CLK_2X_IN signal from the clock generation block 128 and generates a WR_CLK_2X_OUT and a WR_CLK_2X_LEV_OUT. The WR_CLK_2X_OUT and WR_CLK_2X_LEV_OUT are forwarded within the SSG 126 to the data circuits 200, the strobe circuit 250, and the write-leveling controller 1200. The master 1-bit counter 1210 receives the WR_CLK_2X and WR_CLK_SYNC signals and generates a WR_CNT signal that is forwarded to the data circuits 200 and the strobe circuit 250 and an output signal that is forwarded on connection 1215 to the domain-crossing circuit 1230. The master 1-bit counter 1210 operates in accordance with the ASIC clock domain (i.e., an unleveled clock domain).

The decoder 1220 receives and converts the WR_LEV_CNFG signal to a corresponding delay control signal which is coupled on connection 1225 to the domain-crossing circuit 1230. The domain-crossing circuit 1230 uses a multiple-stage counter (inside the master counter 1210) and a multiplexer to eliminate hazards associated with a mistimed WR_CNT signal. The multiple-stage counter provides adequate setup and hold margins to support the available control range encoded in the WR_LEV_CNFG signal. The domain-crossing circuit 1230 controllably forwards one of an advanced version of the output signal from the master 1-bit counter 1210, the output signal from the master 1-bit counter 1210, or a delayed version of the output signal from the master 1-bit counter 1210 on connection 1235 to the slave 1-bit counter 1240 in response to the output of the decoder on connection 1225. The slave 1-bit counter 1240 receives the WR_CLK_2X_LEV signal and the WR_CLK_SYNC_LEV signals and generates the WR_CNT_LEV signal. The WR_CNT and WR_CNT_LEV signals are distributed as free-running synchronization signals in the WR_CLK_2X domain and the WR_CLK_2X_LEV domain, respectively. The WR_CLK_2X_IN signal is connected to the input of the clock delay element 1250 and the input of the first clock buffer 1260. The output of the clock delay element 1250 is coupled to the input of the second clock buffer 1270 on connection 1255. The WR_LEV_CNFG[3:0] input is coupled to the control input of the delay buffer 1250. The WR_CLK_2X_OUT signal is coupled to the output of the first clock buffer 1260 on connection 1265. The WR_CLK_2X_LEV_OUT signal is provided on connection 1275 at the output of the second clock buffer 1270. The delay element 1250 controllably delays the WR_CLK_2X_IN signal in response to the WR_LEV_CNFG[3:0] signal from the memory controller 110 so that the WR_CLK_2X_LEV_OUT signal represents a delayed version of the WR_CLK_2X_OUT signal. The WR_CLK_2X_OUT signal is driven out of the write leveling controller 1200 and distributed to the WR_CLK_2X inputs of the data circuit 200, the strobe circuit 250, and the write leveling controller 1200 with matched insertion delay. The WR_CLK_2X_LEV_OUT signal is driven out of the write leveling controller 1200 and distributed to the WR_CLK_2X_LEV inputs of the data circuit 200, the strobe circuit 250, and the write leveling controller 1200 with matched insertion delay. The WR_CLK_2X_LEV signal is therefore a delayed version of the WR_CLK_2X signal, with the delay being the write-leveling delay.

Figure 13A:
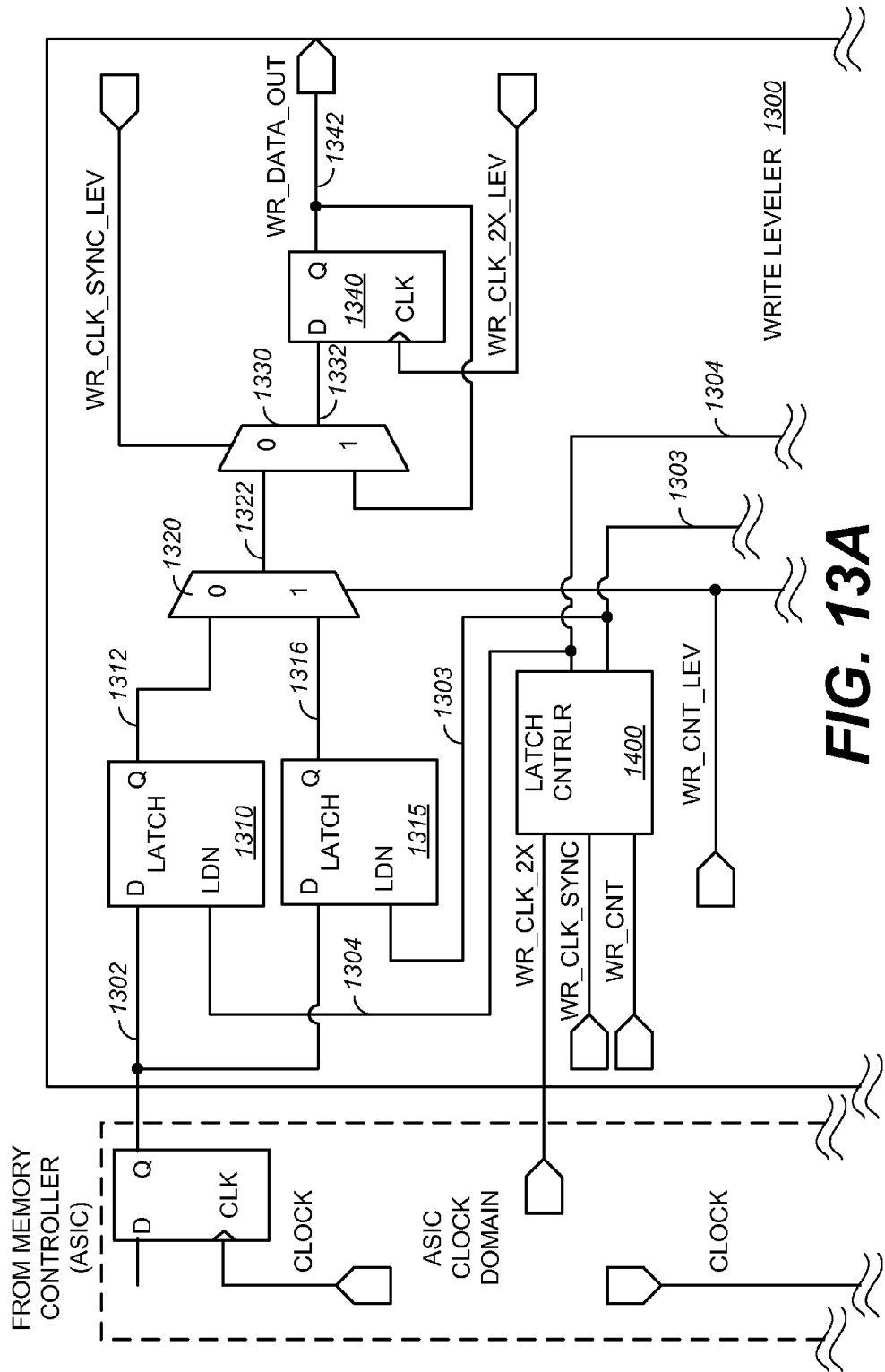
FIGS. 13A and 13B include a schematic diagram illustrating an embodiment of the write leveler of FIG. 1.

FIG. 13A is a schematic diagram illustrating a first portion of an embodiment of the write leveler 1300 of FIG. 1. The write leveler 1300 receives a registered data signal on connection 1302 from the memory controller 110. The write leveler 1300 also receives the WR_CLK_2X signal, the WR_CLK_SYNC signal, the WR_CNT_LEV signal and the WR_CLK_2X_LEV signal and uses these signals to generate a WR_DATA_OUT signal.

The write leveler 1300 includes a first latch 1310, a second latch 1315, a first multiplexer 1320, a recirculating multiplexer 1330, a register 1340, and a latch controller 1400. An embodiment of the latch controller 1400 is illustrated and described in association with the detailed description of FIG. 14.

The received data signal on connection 1302 is coupled to the respective inputs of the first latch 1310 and the second latch 1315. The latch controller 1400 receives the WR_CLK_2X signal, the WR_CLK_SYNC signal and the WR_CNT signal and generates a first latch control signal that is forwarded on connection 1304 to the level sensitive input of the first latch 1310 and a second latch control signal that is forwarded on connection 1303 to the level sensitive input of the second latch 1315. The master 1-bit counter 1210, in combination with the WR_CLK_2X and WR_CLK_SYNC signals (all in the unleveled domain or ASIC generated clock domain) controls latch loading. One of the first latch 1310 or second latch 1315 is loaded with a data bit from the memory controller 110 on connection 1302 on every clock cycle, or every second cycle of WR_CLK_2X. The latch load signals 1312 and 1316 are active (logic "0") for one half of a WR_CLK_2X cycle. Thus the data stored in the latches 1310 and 1315 remains valid for three and one-half WR_CLK_2X cycles, or greater than one and a half cycles of the 1× frequency clock. The output of the first latch 1310 is forwarded on connection 1312 to a first data input of the first multiplexer 1320. The output of the second latch 1315 is forwarded on connection 1316 to a remaining data input of the first multiplexer 1320. The slave 1-bit counter 1240 (in the leveled clock domain) controls the first multiplexer 1320. That is, the WR_CNT_LEV signal is used to controllably select one of the first latch output or the second latch output, which is coupled on connection 1322 to a first input of the recirculating multiplexer 1330. A second input of the recirculating multiplexer 1330 is coupled to the output of the register 1340. The output of the recirculating multiplexer 1330 is coupled via connection 1332 to the input of the register 1340. The recirculating multiplexer 1330 controllably forwards one of the output of the first multiplexer or the output of the register 1340 in accordance with the WR_CLK_SYNC_LEV signal. The register 1340 forwards the WR_DATA_OUT signal from its data output on connection 1342 in accordance with the WR_CLK_2X_LEV signal.

The illustrated embodiment of the write leveler 1300 in FIG. 13A includes a single data rate implementation for simplicity of illustration and description. In the illustrated embodiment, a data bit or input is latched or stored on every other clock cycle and every clock cycle the stored data bit in one or the other latch is loaded into a register and is driven out of the circuit. However, data write operations with a DDR3 memory device are performed at a double date rate. That is, in a double data rate implementation, the write leveler 1300 will receive a second data input that will be stored on every other clock cycle in respective latches coupled to the latch controller 1400 (not shown). An additional multiplexer similar to the multiplexer 1320 is arranged to receive the outputs of the respective latches. The additional multiplexer selects the stored data and forwards the same to the second input of the multiplexer 1330. The recirculating input to the multiplexer 1330, shown in FIG. 13A, is no longer needed. As a result, in a double data rate circuit implementation, two data bits are received and every clock cycle there is a data bit driven out of the circuit during the first half of the clock cycle and a second data bit driven out of the circuit during the second half of the clock cycle. That is, every time the WR_CLK_2X signal has a rising edge, a data bit is driven out of the write leveler 1300.

Figure 13B:
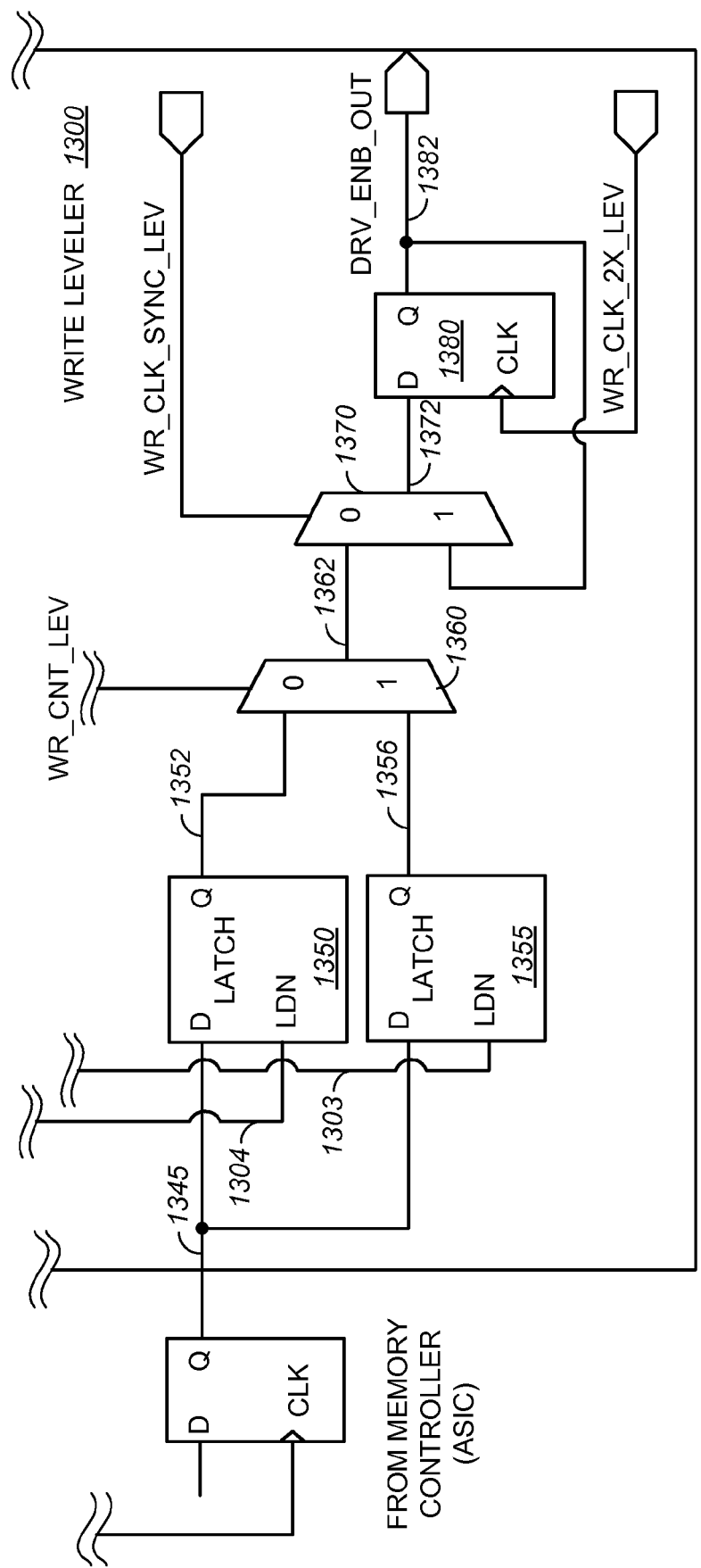

FIG. 13B is a schematic diagram illustrating a second portion of an embodiment of the write leveler 1300 of FIG. 1. This second portion of the write leveler 1300 includes a circuit for generating a driver enable control signal which matches the write leveling timing requirements of the WR_DATA_OUT signal. The write leveler 1300 further includes a third latch 1350, a fourth latch 1355, a second multiplexer 1360, a second recirculating multiplexer 1370, and a second register 1380.

A received driver control signal on connection 1345 is coupled to the respective inputs of the third latch 1350 and the fourth latch 1355. The first latch control signal on connection 1304 is coupled to the level sensitive input of the third latch 1350. The second latch control signal on connection 1303 is coupled to the level sensitive input of the fourth latch 1355. The output of the third latch 1350 is forwarded on connection 1352 to a first data input of the second multiplexer 1360. The output of the fourth latch 1355 is forwarded on connection 1356 to a remaining data input of the second multiplexer 1360. The slave 1-bit counter 1240 (in the leveled clock domain) controls the second multiplexer 1360. That is, the WR_CNT_LEV signal is used to controllably select one of the third latch output or the fourth latch output, which is coupled on connection 1362 to a first input of the second recirculating multiplexer 1370 on alternate cycles of the 1× clock or on every 4$^{th}$ cycle of WR_CLK_2X_LEV. A second input of the recirculating multiplexer 1370 is coupled to the output of the second register 1380. The output of the recirculating multiplexer 1370 is coupled via connection 1372 to the input of the second register 1380. The second recirculating multiplexer 1380 controllably forwards one of the output of the second multiplexer or the output of the second register 1380 in accordance with the WR_CLK_SYNC_LEV signal. The second register 1380 forwards the DRV_ENB_OUT signal from its data output on connection 1382 in accordance with the WR_CLK_2X_LEV signal.

Figure 14:
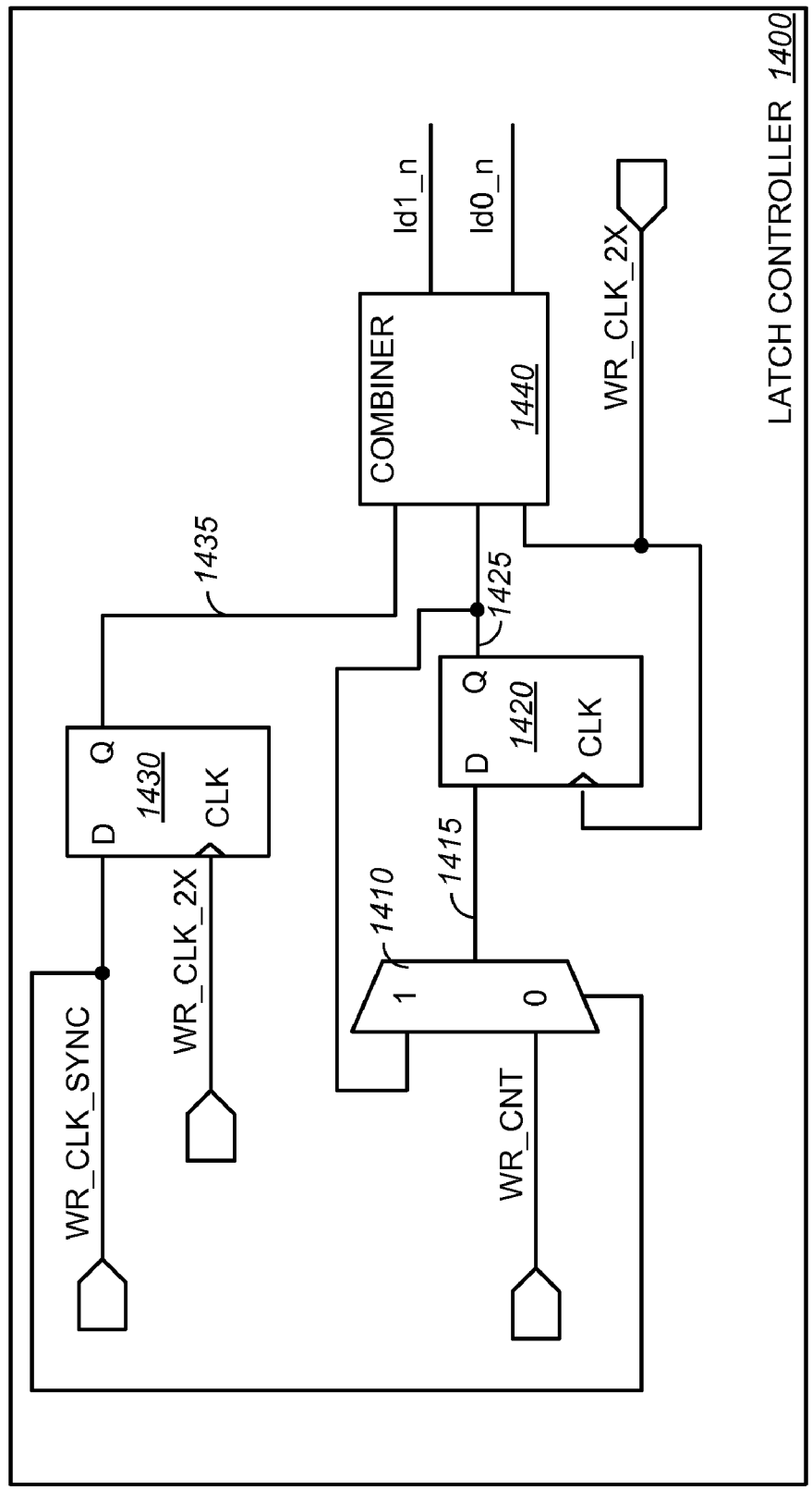
FIG. 14 is a schematic diagram illustrating an embodiment of the latch controller of FIGS. 13A and 13B.

FIG. 14 is a schematic diagram illustrating an embodiment of the latch controller 1400 of FIG. 13. The latch controller 1400 receives the WR_CLK_2X signal, the WR_CLK_SYNC signal and the WR_CNT signal and generates a first load level control signal 1$d$0_$n$ and a second load level control signal 1$d$1_$n$. The latch controller 1400 includes a first register 1430, a second register 1420, a multiplexer 1410 and a combiner 1440. The WR_CLK_SYNC signal is coupled to the data input of the first register 1430 and the control input of the multiplexer 1410. The WR_CLK_2X signal is coupled to the respective clock inputs of the first register 1430 and the second register 1420 as well as the combiner 1440. The output of the first register 1430 is coupled to a first input of the combiner 1440 on connection 1435. The output of the second register 1420 is coupled to a first input of the multiplexer 1410 and a second input of the combiner 1440. The WR_CNT signal is coupled to the remaining input of the multiplexer 1410. The output of the multiplexer 1410 is coupled to the input of the second register 1420 on connection 1415. The combiner 1440 receives the WR_CNT generated signal on connection 1425 and the WR_CLK_SYNC generated signal on connection 1435 and generates the latch control signals in accordance with the WR_CLK_2X signal.

Figure 15A:
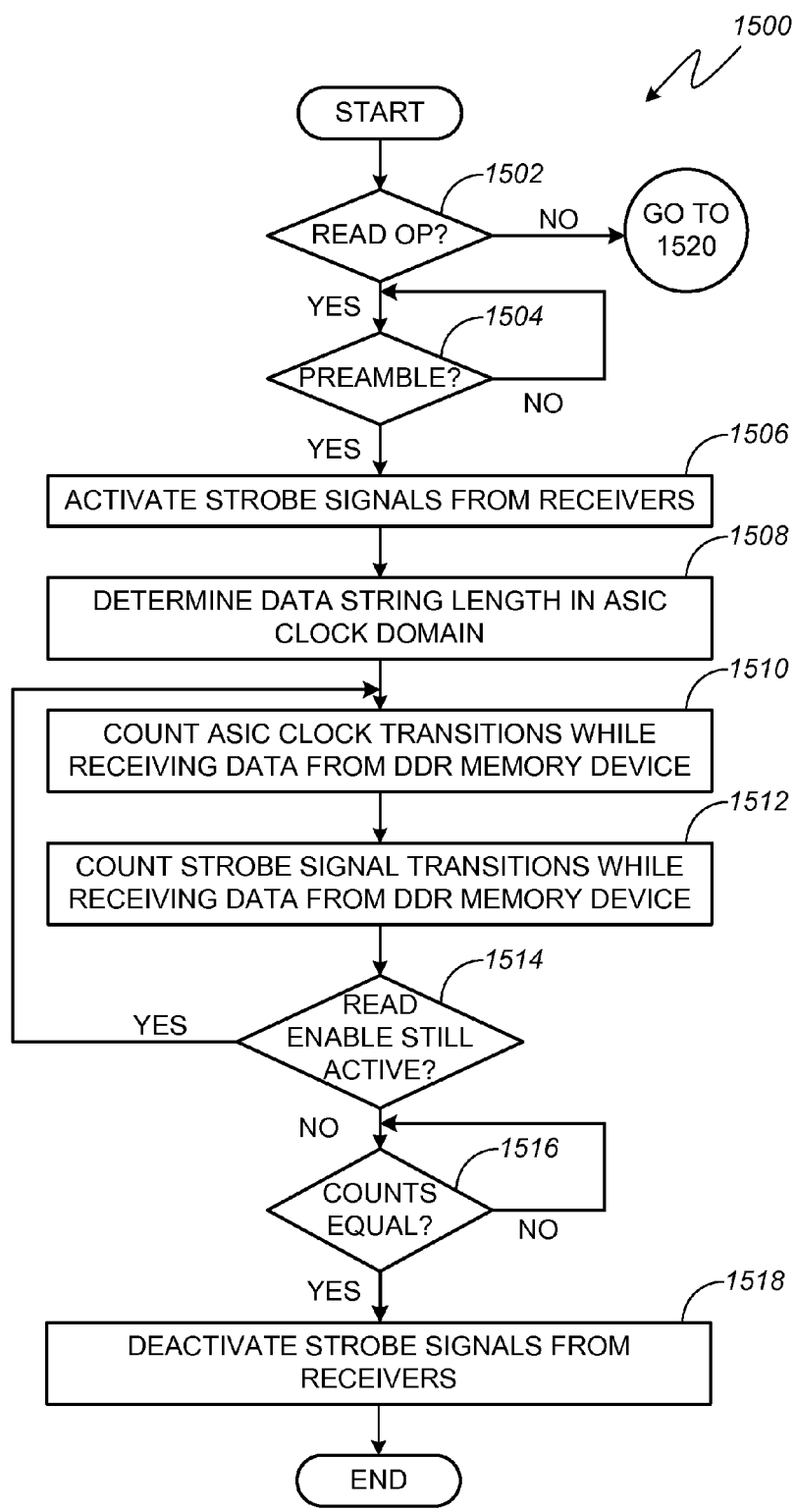
FIGS. 15A and 15B include a flow chart illustrating an embodiment of a method for communicating with a DDR memory device.
Figure 15B:
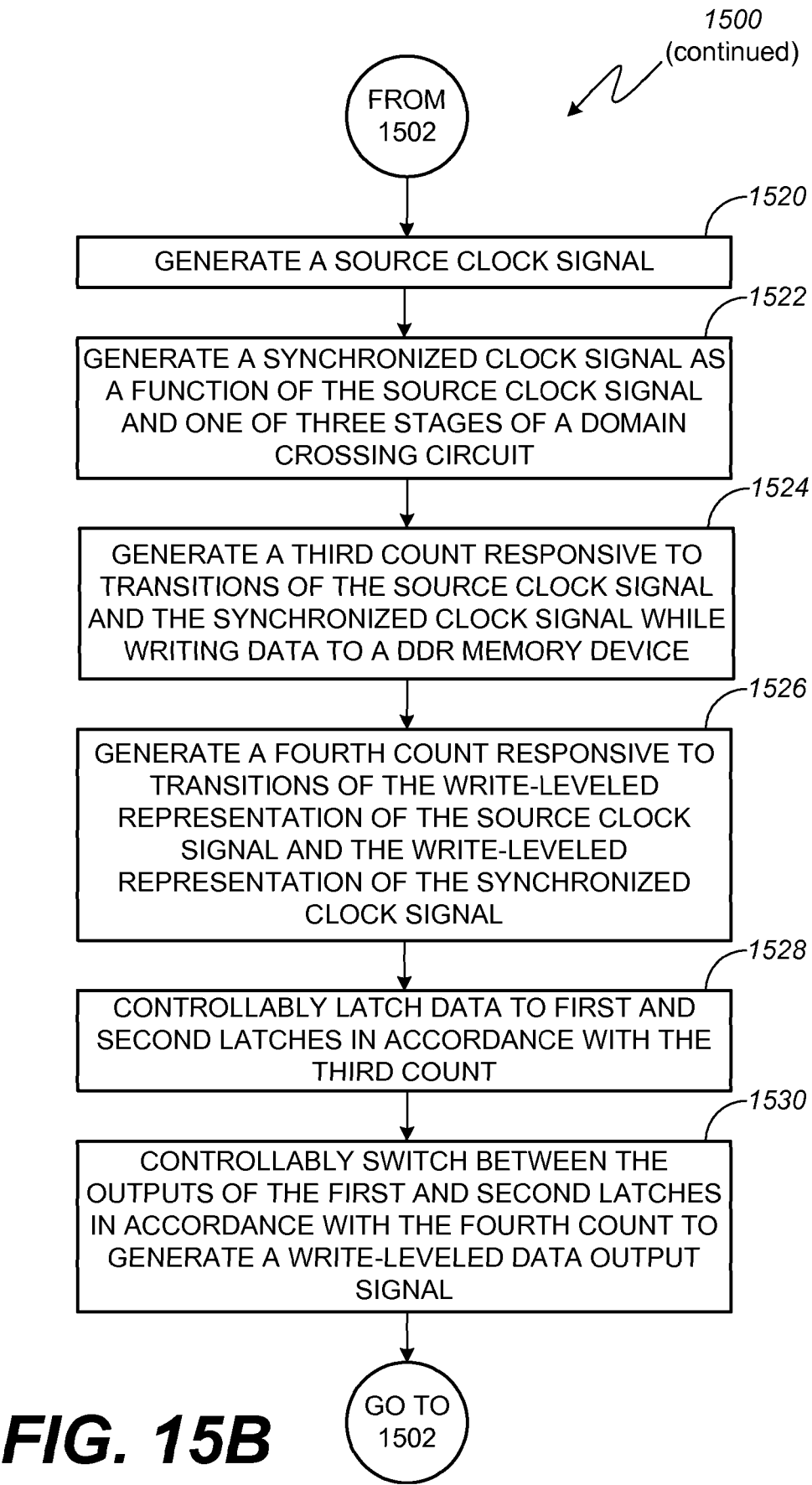

FIGS. 15A and 15B include a flow chart illustrating an embodiment of a method 1500 for communicating with a DDR memory device. The method 1500 begins with decision block 1502, where it is determined if a read operation is desired. When a read operation is not to be performed, as indicated by the flow control arrow labeled "NO," exiting decision block 1502, the method 1500 continues with block 1520 where a series of steps perform a write operation. Otherwise, when it is determined that a read operation is to be performed, the method continues to decision block 1504, where it is determined if a strobe preamble signal is present. When the strobe preamble is not detected, the method 1500 will check repeatedly for the strobe preamble, as indicated by the flow control arrow labeled "NO," exiting decision block 1504. Otherwise, when the strobe preamble is present, processing continues with block 1506 where strobe signals from receivers on the strobe circuit 250*b* are activated. In block 1508, the data string length is determined in the ASIC-generated clock domain. Thereafter, as indicated in block 1510, ASIC-generated clock transitions are recorded while receiving data from the DDR memory device. In block 1512, strobe signal transitions are recorded while receiving data from the DDR memory device. Next, in decision block 1514, it is determined whether the read enable signal is still active. When the read enable signal is active, the steps associated with blocks 1510 and 1512 are repeated. When the read enable signal is inactive, it is determined in decision block 1516 whether the number of ASIC-clock signal transitions and strobe signal clock signal transitions recorded in blocks 1510 and 1512 respectively are equal. Once the counts are equal, processing continues with block 1518 where the strobe signals are deactivated or parked.

In block 1520 a source clock is generated. Thereafter, in block 1522 a synchronizing signal is generated as a function of the source clock signal and one of three stages of a domain crossing circuit. In block 1524, a third count responsive to transitions of the source clock signal and the synchronizing signal is recorded while data is being written to a DDR memory device. In block 1526, a fourth count is generated in response to transitions of the write-leveled representation of the source clock signal and the write-leveled (i.e., delayed) representation of the synchronizing signal. In block 1528, data is controllably latched to a first latch and a second latch in accordance with the third count. In block 1530, the outputs of the first and second latches are controllably switched in accordance with the fourth count to generate a write-leveled data output signal. Thereafter, as indicated by the connector, processing returns decision block 1502.

While various example embodiments of the circuits and methods for communicating with a DDR memory have been described, it will be apparent to those of ordinary skill in the art that many more embodiments and implementations are possible that are within the scope of this disclosure. Accordingly, the described circuits and methods for communicating with a DDR memory are not to be restricted or otherwise limited except in light of the attached claims and their equivalents.

What is claimed is:

1. An input/output interface for communicating between an application specific integrated circuit (ASIC) with a memory controller and a double data rate (DDR) memory device, the interface comprising:
a strobe circuit comprising:
   a preamble logic element arranged to receive strobe signals from the DDR memory device and generate a preamble signal;
   a first counter arranged to receive the preamble signal and the strobe signals, the first counter generating a strobe count signal;
   a second counter arranged to receive a read enable signal and an ASIC-generated clock, the second counter generating a read count signal and a delayed version of the read enable signal;
   a strobe park circuit arranged to receive the preamble signal, the read count signal, the delayed version of the read enable signal and the strobe count signal, the strobe park circuit defining a strobe inactive state and strobe active states, each of the strobe inactive state and the strobe active states being valid for the duration of the preamble signal, the strobe park circuit transitioning from a second strobe active state to the strobe inactive state in response to a transition of the delayed version of the read enable signal and transitioning from a third strobe active state to the strobe inactive state in response to a transition of a function of the strobe count signal and the read count signal, the strobe park circuit tolerant of metastability issues in the read enable signal, the preamble signal and the function of the strobe count signal and the read count signal; and
   a first synchronizer arranged to receive the ASIC-generated clock and generate a synchronized count in response to a reset signal from the memory controller; and a data circuit comprising:
   a FIFO buffer arranged to receive a data input from the DDR memory device, the strobe signals, and the strobe count signal, the FIFO buffer generating a read data signal; and
   a second synchronizer arranged to receive the read data signal, the ASIC-generated clock, and the synchronized count, the second synchronizer generating a representation of the read data signal in synchronization with the ASIC-generated clock.

2. The interface of claim 1, wherein the preamble logic comprises a detector, a glitch suppressor and a pulse generator.

3. The interface of claim 2, wherein the detector comprises a true offset amplifier arranged to receive a true strobe signal at a non-inverting input and a reference voltage at an inverting input, a complimentary offset amplifier arranged to receive a complimentary strobe signal at a non-inverting input and the reference voltage at an inverting input and a NOR logic gate arranged to receive the respective outputs of the true offset amplifier and the complimentary offset amplifier and generate a preamble detection signal.

4. The interface of claim 2, wherein the detector comprises a pair of differential offset amplifiers coupled to a true strobe signal and a complimentary strobe signal, respectively, and a NOR logic gate arranged to receive the respective outputs of the differential offset amplifiers and generate a preamble detection signal, the pair of differential offset amplifiers responsive to an offset voltage.

5. The interface of claim 2, wherein the glitch suppressor comprises a first delay element and a first NAND logic gate, the glitch suppressor generating a glitch suppressor output signal that is coupled to an input of the pulse generator.

6. The interface of claim 5, wherein the pulse generator comprises an inverter, a second delay element and a second NAND logic gate, the pulse generator generating a pulse generator output signal that is used by the interface to reset the strobe park circuit.

7. The interface of claim 1, wherein the strobe park circuit comprises a signal buffer and a state machine.

8. The interface of claim 7, wherein the signal buffer comprises a first delay element and a comparator, the first delay element arranged to generate a read data enable signal that is responsive to the ASIC-generated clock and coupled to a first input of the state machine and wherein the comparator is arranged to generate a counter equalization signal responsive to the strobe signal and the ASIC-generated clock.

9. The interface of claim 7, wherein the state machine comprises 4 valid states responsive to the delayed version of the read enable signal and a function of the read count signal and the strobe count signal.

10. The interface of claim 9, wherein the state machine transitions from the first strobe active state to a second strobe active state or a third strobe active state before returning to the strobe inactive state.

11. The interface of claim 1, further comprising a write leveler having a pair of latches responsive to a third counter and a fourth counter, the third counter and fourth counter forming a pair of synchronized counters, wherein the third counter operates in an unleveled clock domain and controls loading of the pair of latches and wherein the fourth counter operates in a leveled clock domain and controls a multiplexer.

12. The interface of claim 11, wherein the write leveler generates and holds valid data for greater than one and a half clock cycles in the unleveled clock domain.

13. The interface of claim 11, wherein the write leveler comprises a latch controller, the latch controller responsive to write count, clock synchronization and 2X clock signals, where X is a frequency associated with a reference clock signal.

14. The interface of claim 1, further comprising a write-leveling controller comprising a first 1-bit counter operating in response to the ASIC-generated clock, a second 1-bit counter operating in the write-leveled domain, a decode logic element responsive to programmable delay information received from the memory controller and a domain crossing circuit, the domain crossing circuit arranged to receive an output from the first 1-bit counter and a signal from the decode logic and generate a first 1-bit counter output that is coupled to a data input of the second 1-bit counter.

15. The interface of claim 14, wherein the decode logic element receives an N-bit word from the memory controller that when decoded and applied to the domain crossing circuit enables $2^N$ different delay periods.

16. A method for communicating between an application specific integrated circuit (ASIC) and a double data rate (DDR) memory device, including a read mode that provides a timing window of greater than two clock cycles to define the timing relationship between a strobe preamble transition and a read data enable signal transition and a write mode providing a phase offset range of greater than one clock cycle, the method comprising:
in a read mode:
  detecting a strobe preamble;
  using a state machine to activate strobe receiver output signals in response to the strobe preamble;
  receiving an indication via signal transitions in an ASIC-generated clock and a read data enable signal of a data string length to be read from the DDR memory device;
  generating a first count of ASIC-generated clock signal transitions while receiving data from the DDR memory device;
  generating a second count of incoming strobe signal transitions while receiving data from the DDR memory device;
  determining when the read data enable signal transitions;
  generating a control signal when the first count and the second count are equal; and
  using the state machine to deactivate the strobe receiver output signals in response to one of the read data control signal transition and the control signal, the state machine defining one inactive state and at least two active states before returning to the one inactive state, the state machine tolerant of metastability issues;
in a write mode:
  generating a source clock signal responsive to the ASIC-generated clock;
  generating a synchronizing signal as a function of the source clock signal and a select one of three stages from a domain crossing circuit;
  generating a write-leveled representation of the source clock signal and the synchronizing signal;
  generating a third count responsive to transitions of the source clock signal and the synchronizing signal;
  generating a fourth count responsive to transitions of the write-leveled representation of the source clock signal and the write-leveled representation of the synchronizing signal;
  controllably latching data to be written to the DDR memory device to a first latch and a second latch in accordance with the third count; and
  controllably switching between an output of the first latch and an output of the second latch in accordance with the fourth count to generate a data output signal.

17. The method of claim 16, wherein detecting a strobe preamble comprises receiving a reference voltage, a true strobe signal, and a complimentary strobe signal, applying the true strobe signal to the non-inverting input of a true offset amplifier, applying the complimentary strobe signal to the non-inverting input of a complimentary offset amplifiers, applying the reference voltage to inverting inputs of the true and complimentary offset amplifiers, and coupling outputs of the true and complimentary offset amplifiers to a NOR logic gate.

18. The method of claim 16, wherein using the state machine further comprises monitoring the read data enable signal and the control signal.

19. The method of claim 16, wherein the steps of controllably latching and controllably switching combine to maintain data in a valid condition for greater than one and a half clock cycles.

20. The method of claim 16, further comprising in the write mode:
  applying programmable delay information received from a memory controller to a domain crossing circuit, the domain crossing circuit arranged to receive an output from a first 1-bit counter and a signal from a decode logic element and generate a first 1-bit counter output that is coupled to a data input of a second 1-bit counter, the first 1-bit counter operating in an ASIC clock domain and the second 1-bit counter operating in a leveled domain.

21. The method of claim 20, wherein the decode logic element receives an N-bit word from the memory controller that when decoded and applied to the domain crossing circuit enables $2^N$ different delay periods.

* * * * *